United States Patent [19]

Sashida et al.

[11] Patent Number: 5,257,180

[45] Date of Patent: Oct. 26, 1993

[54] CONTROLLING SYSTEM FOR PARALLEL OPERATION OF AC OUTPUT INVERTERS WITH RESTRAINED CROSS CURRENTS

[75] Inventors: Nobuo Sashida; Yushin Yamamoto, both of Kobe, Japan

[73] Assignee: Mitsubishi Denki Kabushiki Kaisha, Tokyo, Japan

[21] Appl. No.: 871,682

[22] Filed: Apr. 21, 1992

[30] Foreign Application Priority Data

| Apr. 22, 1991 | [JP] | Japan | 3-118032 |
| Apr. 25, 1991 | [JP] | Japan | 3-122671 |
| Jun. 14, 1991 | [JP] | Japan | 3-169476 |
| Jun. 25, 1991 | [JP] | Japan | 3-180344 |

[51] Int. Cl.$^5$ ............................................. H02M 7/48
[52] U.S. Cl. ................................ 363/71; 363/95; 363/98; 363/132
[58] Field of Search .............. 363/34, 37, 65, 71, 363/72, 95, 98, 132

[56] References Cited

U.S. PATENT DOCUMENTS

| 4,276,590 | 6/1981 | Hansel et al. | 363/71 |
| 4,383,183 | 5/1983 | Schlenk et al. | 307/43 |
| 4,677,535 | 6/1987 | Kawabata et al. | 363/65 |
| 4,802,079 | 1/1989 | Mizoguchi | 363/71 |
| 4,947,310 | 8/1990 | Kawabata et al. | 363/71 |
| 5,031,088 | 7/1991 | Tanaka | 363/71 |
| 5,047,909 | 9/1991 | Hosoda | 363/71 |
| 5,111,377 | 5/1992 | Higasa et al. | 363/95 |
| 5,121,315 | 6/1992 | Moriya | 363/37 |

FOREIGN PATENT DOCUMENTS

| 2231152 | 1/1974 | Fed. Rep. of Germany. |
| 3917337 | 12/1989 | Fed. Rep. of Germany. |
| 53-36137 | 9/1978 | Japan. |
| 56-13101 | 3/1981 | Japan. |

OTHER PUBLICATIONS

Kawabata et al., "Parallel Operation of Voltage Source Inverter", Oct. 1986, IEEE Industry Applications Society Annual Meeting, pp. 542-548.
Patent Abstracts of Japan, E section, vol. 1, No. 20, Mar. 24, 1977, Kokai 51-118,036.

Primary Examiner—J. L. Sterrett
Attorney, Agent, or Firm—Leydig, Voit & Mayer

[57] ABSTRACT

Disclosed is a parallel power supply system including AC output inverters for controlling instantaneous values of output voltages by causing arms of respective inverters of the AC output inverters to effect switching in respective phases of the output voltages plural times during one cycle. A bus for connecting outputs on the inverters to a load so that a load current is shared by the inverters. A synchronous circuit for synchronizing the respective inverters by outputting common synchronous signals to the inverters. A detection circuit for detecting a cross current component of an electric current flowing between the respective inverters, and a control circuit for controlling the output voltages of the inverters to restrain the cross current component detected by the detection circuit.

15 Claims, 29 Drawing Sheets $\alpha = \text{arc tan}\left(\frac{X}{R}\right)$

TO TWO-PHASE/THREE-PHASE CONVERTING CIRCUIT
THREE-PHASE/TWO-PHASE CONVERTING CIRCUIT

CONTROLLING SYSTEM FOR PARALLEL OPERATION OF AC OUTPUT INVERTERS WITH RESTRAINED CROSS CURRENTS

BACKGROUND OF THE INVENTION

1. Field of the Invention

The present invention relates to a parallel operation system in which a plurality of AC output inverters are operated in parallel with respect to a common load.

2. Related Background Art

In the case where two AC power supply devices (hereinafter simply referred to as power supplies) 1, 2 are, as illustrated in FIG. 32, operated in parallel with respect to a common load 4. Let $E_1$, $E_2$ be the output voltages of the respective power supplies 1, 2; let Z be the internal impedances, equal to each other, of the respective power supplies 1, 2; and let $I_1$, $I_2$ be the output currents of the power supplies 1, 2. It is also assumed that $E_A$ is the voltage (common output voltage) at a common connecting point A to which the load 4 is connected; R is the resistance component of an internal impedance Z; and X is the reactance. This internal impedance Z can be expressed by the following formula:

$$Z = R + jX \quad (1)$$

In this case, an absolute value $|Z|$ of the internal impedance and an internal impedance angle 0 are given by the following formulae:

$$|Z| = \sqrt{R^2 + X^2} \quad (2)$$

$$\phi = \tan^{-1}(X/R) \quad (3)$$

Further, in a circuit illustrated in FIG. 34, the following formula is established:

$$E_1 - ZI_1 = E_2 - ZI_2 = E_A \quad (4)$$

If a cross current is defined as a difference between a self-output-current and an average of individual output currents, a cross current $\Delta I_1$ seen from the power supply 1 and a cross current $\Delta I_2$ seen from the power supply 2 are expressed by the following formulae:

$$\Delta I_1 = I_1 - \tfrac{1}{2}(I_1 + I_2) = \tfrac{1}{2}(I_1 - I_2) \quad (5)$$

$$\Delta I_2 = I_2 - \tfrac{1}{2}(I_1 + I_2) = \tfrac{1}{2}(I_1 - I_2) \quad (6)$$

From the formula (4), the following formula is established:

$$E_1 - E_2 = Z(I_1 - I_2) \quad (7)$$

From the formulae (5), (6) and (7), the following formula is established:

$$\Delta I_1 = -\Delta I_2 = \tfrac{1}{2}(E_1 - E_2)/Z \quad (8)$$

From the formula (8), it can be understood that phases of the cross currents $\Delta I_1$, $\Delta I_2$ are delayed by an internal impedance angle $\phi$ with respect to differential voltages $E_1 - E_2$, $E_2 - E_1$.

Besides, from the formula (4), the following formula is established:

$$E_A = \tfrac{1}{2}(E_1 + E_2) - Z(I_1 + I_2) \quad (9)$$

In general, the internal impedance is much smaller than a load impedance, and in this case, the formula (9) is expressed as follows:

$$E_A = \tfrac{1}{2}(E_1 + E_2) \quad (10)$$

Now, supposing that the output voltages $E_1$, $E_2$ of the power supplies 1, 2 are in the equiphase; and the absolute values are different by $\Delta E$ (i.e., $|E_1| - |E_2| = \Delta E$), a relation of vector on the basis of the output voltage $E_1$ is shown in FIG. 33. To be specific, the cross current vector $I_1$ is delayed by the internal impedance angle $\phi$ with respect to the differential voltage vector $(E_1 - E_2)$. A common output voltage vector $E_A$ is substantially in the equiphase to the output voltage vectors $E_1$, $E_2$ of the two power supplies. Hence, in such a case that the phases are identical; whereas the absolute values are different, the cross current vector $\Delta I_1$ is directed in parallel to (vertical to a virtual vector $E_{AY}$ vertical to a virtual vector $E_{AX}$) a direction of a virtual vector $E_{AX}$ which is more delayed by the internal impedance angle $\phi$ than a common output voltage vector EA.

Next, it is assumed that the absolute values of the output voltages $E_1$, $E_2$ of the power supplies 1, 2 are identical, whereas the phases are different by $\theta$. A relation of vector on the basis of the output voltage $E_1$ is shown in FIG. 34. In this case, the differential voltage vector $(E_1 - E_2)$ is delayed by $(90° - \tfrac{1}{2}\theta)$ with respect to the output voltage vector $E_1$ of the power supply 1. The cross current vector $I_1$ is delayed by the internal impedance angle $\phi$ with respect to the differential voltage vector $(E_1 - E_2)$. The common output voltage vector $E_A$ advances substantially through $\tfrac{1}{2}\theta$ with respect to the output voltage vector $E_1$ but is delayed substantially by $\tfrac{1}{2}\theta$ with respect to the output voltage vector $E_2$. Hence, in such a case that the absolute values are identical; whereas the phases are different, the direction of the cross current vector $I_1$ is vertical (parallel to the virtual vector $E_{AY}$ vertical to the virtual vector $E_{AX}$) to the direction of the virtual vector $E_{AX}$ which is more delayed by the internal impedance angle $\phi$ than the common output voltage vector $E_A$.

Detected, as can be comprehended from the contemplation about the two vector diagrams given above, are a component $I_{1X}$ parallel (vertical to $E_{AY}$) to the reference vector $E_{AX}$ of the cross current vector $I_1$ and a vertical component $\Delta I_{1Y}$ (parallel to $E_{AY}$) on the basis of the virtual vector $E_{AX}$ (or virtual vector $E_{AY}$ vertical thereto) which is more delayed by the internal impedance angle $\phi$ than the common output voltage $E_A$. It is possible to eliminate an output voltage absolute value deviation between the mutual power supplies by performing the output voltage absolute value control so that the parallel component $\Delta I_{1X}$ becomes zero. Further, it is also feasible to eliminate an output voltage phase deviation between the power supplies by effecting the output voltage phase control of the power supplies so that the vertical component $\Delta I_{1Y}$ becomes zero.

FIG. 35 is a block diagram illustrating a conventional parallel operation system of AC output inverters. A first inverter device 1 supplies the electric power to a load 4 while performing the parallel operation via an output bus 3 with respect to a second inverter device 2 having the same construction. The first inverter device 1 includes main components such as an inverter body 140, a reactor 141 constituting a filter and a condenser 142. The first inverter device 1 converts the electric power of a DC power supply 5 into an alternate current and is connected via an output switch 143 to an output bus 3.

A voltage control circuit 146 controls an internally generated voltage by executing a pulse width modulation of the inverter body 140 through a PWM circuit 145 on the basis of signals of a voltage setting circuit 147 and a voltage detection circuit 148.

A detection signal I1a is obtained from an output current $I_1$ of the first inverter device by means of a current detector 144. Obtained by a cross current detection circuit 151 is a difference between the former detection signal and a detection signal I2a similarly obtained from the second inverter device 2, i.e., a signal $I_1$ corresponding to the cross current. Formed next from a phase shifter 150 are a voltage $E_{AX}$ which is more delayed by the internal impedance angle $\phi$ and a voltage $E_{AY}$ which more advances by $0° - \phi$ than the common output voltage $E_A$. An arithmetic circuit 152 outputs a signal $\Delta Q$ proportional to the component $\Delta I_{1X}$ parallel to $E_{AX}$ of the cross current $\Delta I_1$. An arithmetic circuit 153 outputs a signal P proportional to the component $\Delta I_{1Y}$ parallel to $E_{AY}$ of the cross current $\Delta I_1$.

The signal $\Delta Q$ proportional to the component $\Delta I_{1X}$ is given as an additional target value to the voltage control circuit 146. The internally generated voltage of the inverter body 140 is adjusted several % or thereabouts at the maximum so that $\Delta Q$ becomes 0. The output voltage absolute values of the two inverters thereby become identical.

On the other hand, the signal proportional to $\Delta I_{1Y}$ is inputted via an amplifier 154 constituting a PLL circuit to a reference oscillator 155. A frequency of the reference oscillator 155 is infinitesimally adjusted so that $\Delta P$ becomes 0, thus controlling a phase of the internally generated voltage of the inverter body 140. The output voltage phases of the two inverters are made coincident.

In this manner, the absolute values and phases of the voltages are controlled so that both of $\Delta Q$ and $\Delta P$ become zero, as a result of which the cross current between the two inverters is eliminated. The load is stably shared.

The conventional parallel operation system of the inverters, which has been constructed in the way described above, therefore presents the following four problems. The first problem is that the phase of the internally generated voltage of the inverter and the mean value of the voltages are controlled to balance the shared currents, and it is therefore difficult to improve a control response speed. In particular, the instantaneous cross current can not be controlled. The second problem is that the cross current control can not be effected a high speed because of requiring a filter when detecting the cross current while separating the cross current into an active component and a reactive component. For this reason, there is a limit in terms of application in a high-speed voltage control system of instantaneous waveform control for keeping the output of the inverter in a high quality sine wave with a less amount of distortion. The third problem is that the control circuit becomes intricate because of controlling the cross current while separating the cross current into the active and reactive components. The fourth problems is that it is difficult to perform the parallel operation of the inverters and other power supply. Especially, even when operating the inverters and the power system in parallel, it is hard to control the cross current.

SUMMARY OF THE INVENTION

It is a primary object of the present invention, which has been devised to obviate the above-mentioned problems, to provide a parallel operation system of AC output inverters, which is capable of balancing shred currents at a high velocity.

To this end, according to one aspect of the present invention, there is provided a parallel operation system comprising: a plurality of AC output inverters for controlling instantaneous values of output voltages by causing arms in respective phases to effect switching a plurality of times during one cycle; a bus for connecting outputs of the plurality of inverters to a load so that a load current is shared by the plurality of inverters; a synchronous circuit for synchronizing the plurality of inverters by outputting common synchronous signals to the plurality of inverters; a detection circuit for detecting a cross current component of an electric current flowing between the mutual inverters; and a control circuit for controlling the output voltages of the respective inverters to restrain the cross current component detected by the detection circuit.

BRIEF DESCRIPTION OF THE DRAWINGS

Other objects and advantages of the present invention will become more apparent during the following discussion taken in conjunction with the accompanying drawings, in which.

DESCRIPTION OF THE PREFERRED EMBODIMENTS

Embodiments of the present invention will hereinafter be described with reference to the accompanying drawings.

Figure 1:
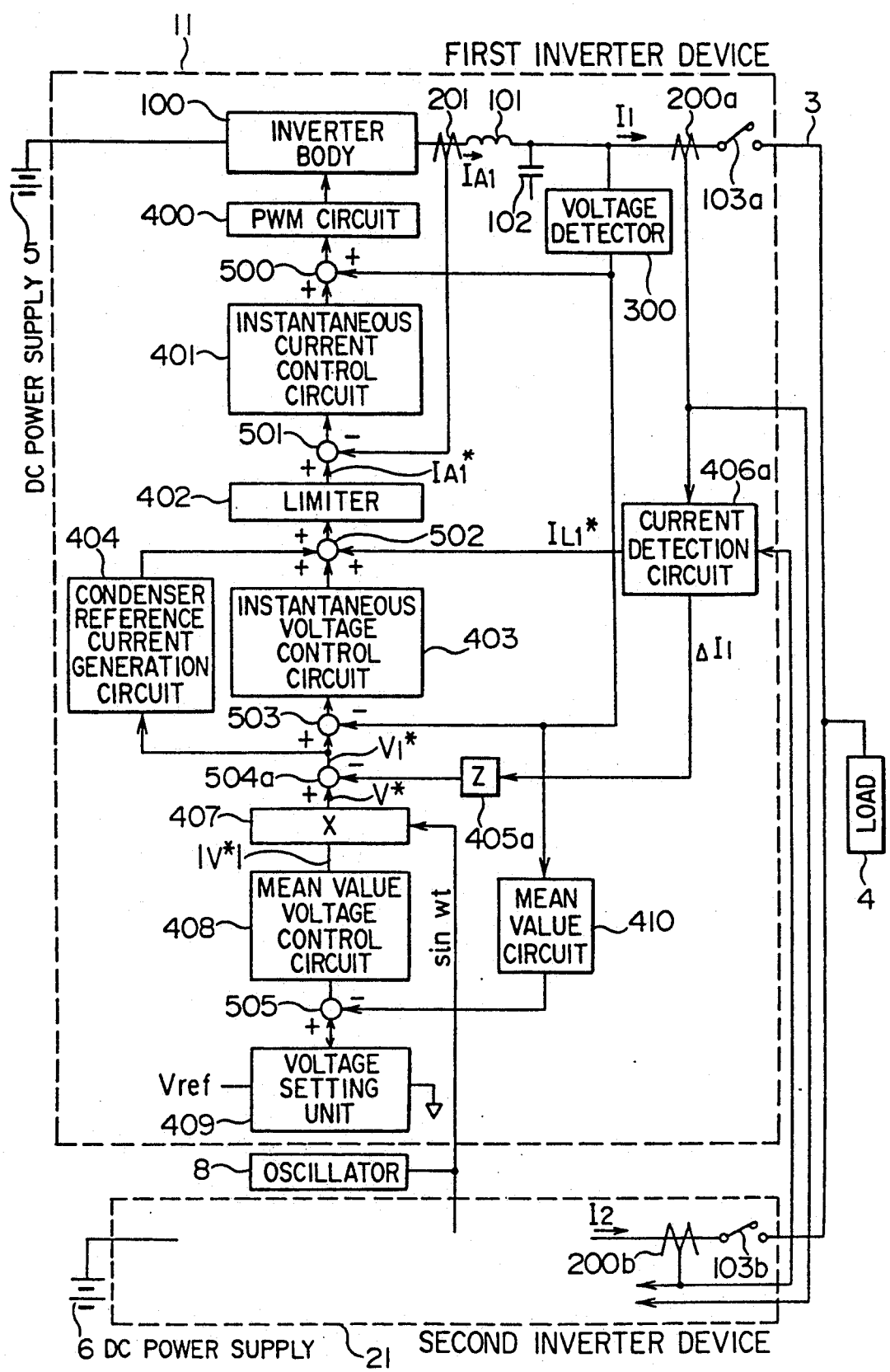
FIG. 1 is a block diagram illustrating a parallel operation system in an embodiment 1 of the present invention.

Embodiment 1:

Referring to FIG. 1, a first inverter device 11 supplies electric power to a load 4 while operating in parallel with a simply illustrated second inverter device 21 having the same construction through an output bus 3. Designated at 5, 6 are a DC power supply connected to the first inverter device 11 and a DC power supply connected to the second inverter device 21.

Numerals after 100 indicate components of the inverter devices. The numerals with no subscript or with the subscript "a" denote components of the first inverter device 1, while the numerals with the subscript "b" represent components of the second inverter device 21.

Figure 2A:
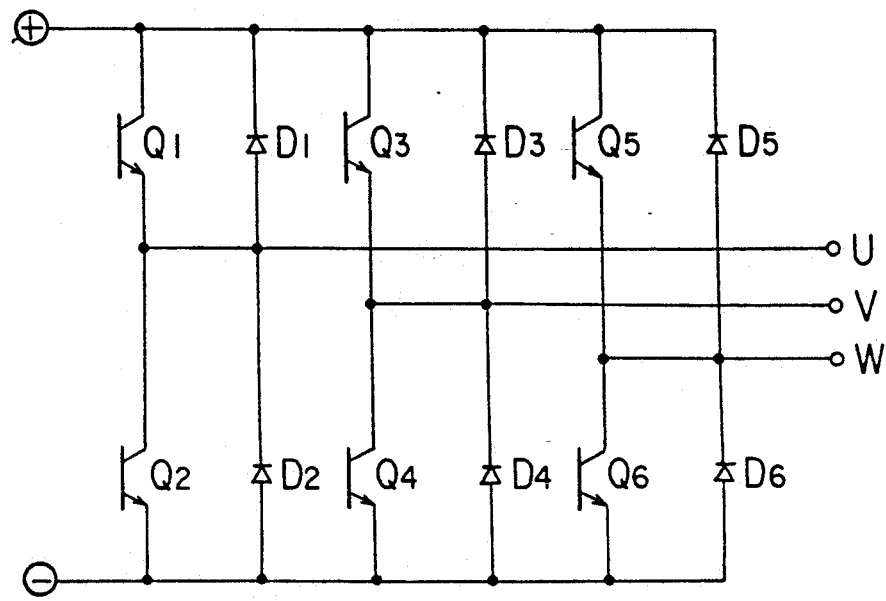
FIGS. 2A and 2B are circuit diagrams each depicting an inverter employed in this invention.
Figure 2B:
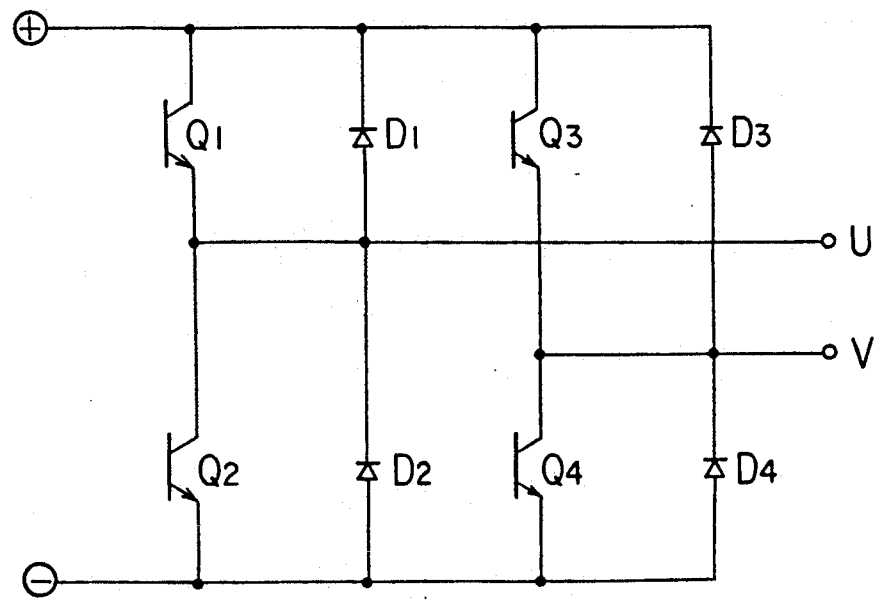

An inverter body generally designated at 100 is composed of self arc-suppressing elements such as, e.g., transistors or MOSFETs capable of performing high frequency switching. Respective arms of a three-phase bridge inverter shown in FIG. 2A and a single-phase bridge inverter illustrated in FIG. 2B are switched at a frequency which is approximately ten times through several hundreds of times as high as an output frequency (e.g., 60 Hz). The inverters serve to convert a DC voltage into a high-frequency AC voltage assuming a rectangular waveform including a sine fundamental wave. The numerals 101, 102 represent a reactor and a condenser, constituting a low-pass filter, for removing harmonics from the high-frequency AC voltage assuming the rectangular waveform and generated by the inverter body 100, and for obtaining a sine wave output voltage. The reactor and the condenser are connected to the output bus 3 through an output switch 103$a$.

A current sensor 200$a$ detects an output current $I_1$ of the first inverter device 11, while a current sensor 201 detects an output current $I_{A1}$ of the inverter body 100. Indicated at 300 is a voltage sensor for detecting a voltage of the condenser 102, i.e., an output bus voltage during the parallel operation.

Further, a PWM circuit 400 for determining a timing of switching of the inverter body 100 is, e.g., a triangular wave comparison PWM circuit makes the inverter body 100 perform switching at a cross point of a voltage command signal for a fundamental wave to be outputted from the inverter body 100 and a triangular wave carrier. An instantaneous current control circuit 401 controls the output current $I_{A1}$ of the inverter body 100. A limiter circuit 402 limits an output current command value of the inverter body 100. An instantaneous voltage control circuit 403 controls the voltage of the condenser 102. A condenser reference current generation circuit 404 outputs a current value to be supplied to the condenser 102 in order to generate a desired output voltage. A virtual impedance circuit 405$a$ causes an operation to restrict a cross current by virtually inserting an impedance Z between the first and second inverter devices, 11, 21. A load current detection circuit 406$a$ detects a cross current outputted by the first inverter device 11 and a value of load current to be shared.

The numeral 407 designates a multiplier for preparing an instantaneous voltage command value to be outputted by the first inverter device 11; 408 a mean value voltage control circuit for controlling a mean value of the output voltages of the first inverter device 11; 409 a voltage setting unit for imparting a command value of the mean value to the voltage control circuit; 410 a mean value circuit for drawing the voltage mean value of the condenser 102 from the output of the voltage detector 300; and 8 an oscillator for giving a clock signal to the multiplier 407 and supplying a common clock signal to the first and second inverter devices 11, 21. Note that 500, 501, 502, 503, 504$a$ and 505 indicate adders-subtracters.

On the other hand, an output of the second inverter device 21 assuming the same construction with the first inverter device 11 is connected in parallel with the first inverter device 11 via the output bus 3. Indicated at 103$b$ is an output switch of the second inverter device 21. The symbol 200$b$ represents a current sensor for detecting the output current $I_2$ of the second inverter device 21.

Figure 3:
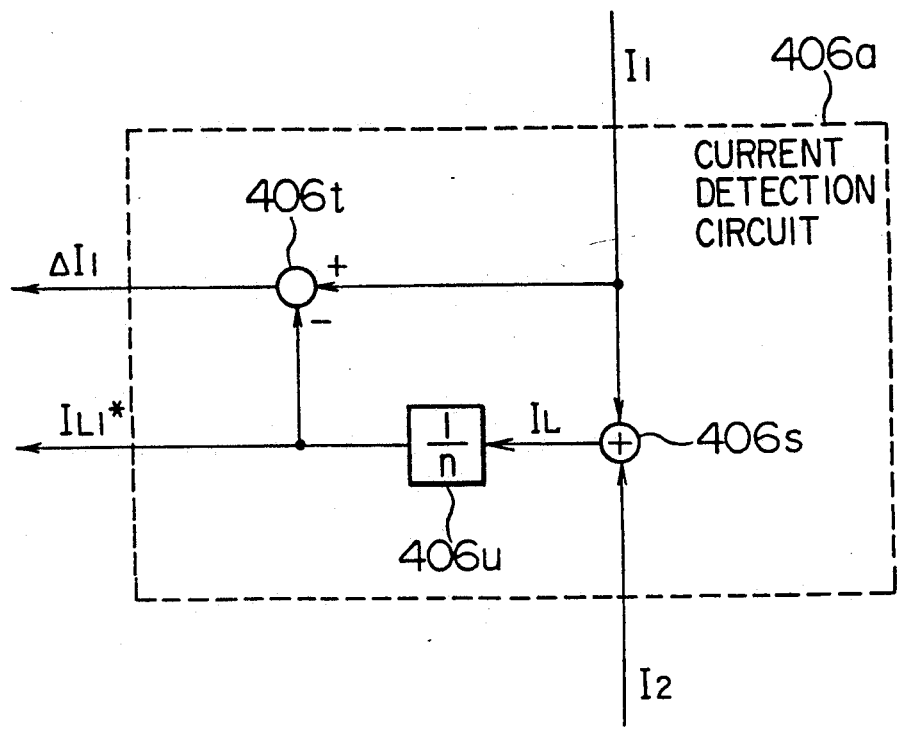
FIG. 3 is a block diagram showing a current detection circuit employed in the embodiment 1.

An internal construction of the current detection circuit 406$a$ is herein demonstrated by a block diagram of FIG. 3. The symbols 406$s$, 406$t$ denote adders-subtracters. An amplifier circuit 406$u$ has a gain of $1/n$ when the number of inverter devices is set to n. The adder 406$s$ adds the output current $I_1$ of the first inverter device 11 and the output current $I_2$ of the second inverter device 21, thereby obtaining a load current $I_L$. A signal thereof is inputted to the amplifier circuit 406$u$. A value of $I_L/n$ is obtained by dividing the load current $I_L$ by the parallel number n (n=2 in the case of the embodiment 1). This value is outputted as a load current $I_{L1}^*$ to be shared by the first inverter device 11. Further, the subtractor 406$t$ arithmetically outputs a difference between the output current $I_1$ of the first inverter device 11 and the current $I_{L1}^*$ to be shared, i.e., a cross current $\Delta I_1 (=I_1-I_{L1}^*)$.

Next, substantial operations associated with the construction described above will be explained. The first inverter device 11 is provided with a current minor loop. The instantaneous current control circuit 401 outputs the command value of the voltage to be applied to the reactor 101 so that the output current $I_{A1}$ of the inverter body 100 which is fed back by the current sensor 201 coincides with the current command $I_{A1}^*$ from the limiter circuit 402. Besides, the condenser 102 and the voltage caused by the second inverter device 21 are present on the output bus 3, and it is therefore required that the inverter body 100 generates a sum of the voltage of the output bus 3 and the voltage to be applied to the rector 101 in order to apply a desired voltage to the reactor 101. Hence, the adder 500 adds the voltage of the condenser 102 which is detected by the voltage detector 300 and the output of the current control circuit 401. A signal thereof is given as a voltage command to the PWM circuit 400.

Further, the condenser reference current generation circuit 404 generates a sine wave reference current signal advancing through 90° from a voltage command $V_1^*$ of the condenser 102 as a current flowing to the condenser in accordance with a capacity of the condenser 102. The voltage command $V_1^*$ of the condenser 102 is obtained from the output of the subtracter 504a, which will be mentioned later. Calculated by the subtracter 503 is a deviation between the voltage command $V_1^*$ of the condenser 102 and the voltage of the condenser 102 which is detected by the voltage detector 300. The instantaneous voltage control circuit 403 inputting this deviation outputs a correction current signal to be outputted by the inverter body 100 in order to reduce the deviation.

The adder 502 calculates a shared load current command value $I_{L1}^*$ of the first inverter device 11 which is outputted by the current detection circuit 406a as well as the outputs of the condenser reference current generation circuit 404 and the instantaneous voltage control circuit 403. Results thereof are limited by the limiter circuit 402, thereby obtaining an output current command $I_{A1}^*$ to the inverter body 100. Therefore, in a non-load state, the inverter body 100 supplies the current flowing to the condenser 102, whereby a non-load voltage is established. In this case, the instantaneous voltage control circuit 403 corrects an underoutput and an overoutput of the condenser reference current generation circuit 404 which are a result of a current control error and an error between a design value and an actual value of the capacity of the condenser 102.

Next, when the load 4 is applied, a command $I_{L1}^*$ is given from the current detection circuit 406a to the current minor loop to share ½ of the load current $I_L$. It follows that each of the inverter devices 11, 21 shares ½ of the load current. The limier circuit 402 is herein intended to limit the command value to the current control circuit 401 down to an allowable current value or under the inverter body 100 so that the inverter body 100 supplies no an overcurrent such as a rush current during the load actuation.

Based on the construction given above, the inverters are protected from the overcurrent by their current minor loops and the limiter 402. Further the output voltage can be kept invariably in the sine wave by immediately following up a distortion and an abrupt change of the load current. A characteristic of this method is that the response is remarkably fast, because the above-mentioned control is performed for every switching of the high frequency PWM of each of the inverter devices. For instance, the control is effected per 100 μsec when using a switching frequency of 10 kHz, and hence an excessive disturbance phenomenon such as the abrupt change of the load is compensated for in a time which is approximately 10 times as long as 100 μsec. An excellent control performance can be obtained.

If the responses and accuracies in terms of voltage control of the first and second inverter devices 11, 21 are identical, the cross current does not flow based on the construction of the control system described above. However, in practice a stable parallel operation with a small amount of cross current is difficult to achieve in the above described system due to variances in the accuracies of the components, a control gain and a main circuit constant. For example, supposing that the voltage detectors of the first and second inverter devices 11, 21 respectively have errors of −0.5%, +0.5%, an output voltage difference V during the single operation is 1%. If it is assumed that a wire impedance between the fits and second inverter devices 11, 21 is 1% or under, it follows that the cross current of 100% or above flows.

Constructed in this embodiment is a control circuit as if the impedance exists with respect to only the cross current flowing between the inverter devices, thereby restricting the cross current. The cross current restriction virtual impedance circuit 405a computes $\Delta I_1 \times Z$, where the cross current is given by $\Delta I_1 = I_1 - I_{L1}^*$, and Z is the transfer function of the virtual impedance. The subtracter 504a subtracts this signal from the voltage command value $V^*$ outputted from the multiplier 407. The result is set as a voltage command $V_1^*$ of the condenser 102. The voltage of the condenser 102 instantaneously follows up the voltage command $V_1^*$ owing to the above-mentioned voltage control system.

Figure 4:
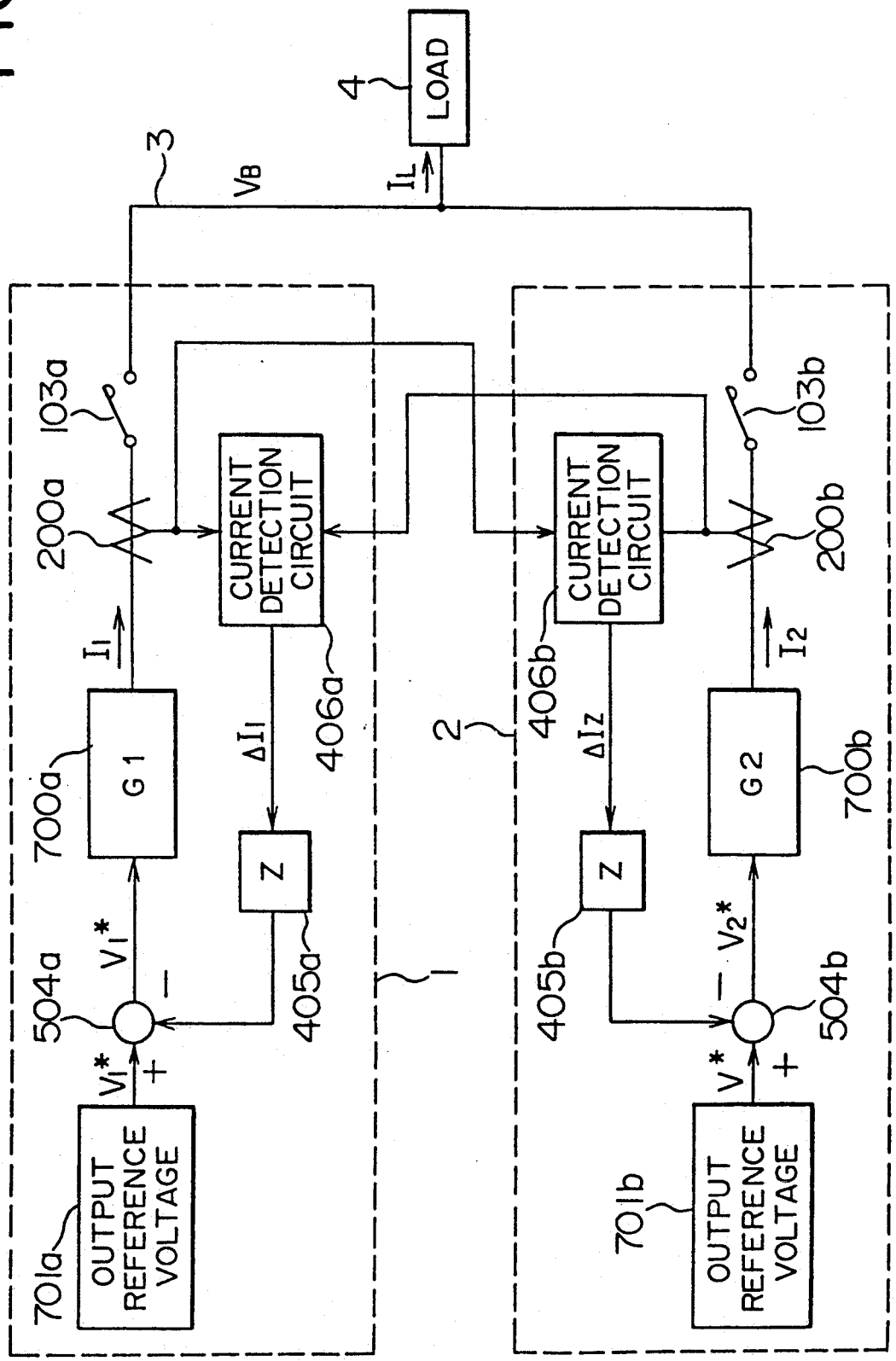
FIG. 4 is a block diagram illustrating a simplified system of FIG. 1.

Given herein in conjunction with FIG. 4 is an explanation of the fact that the inverter devices 11, 21 have an output impedance with respect to only the cross current because of the cross current restriction virtual impedance circuits 405a, 405b and operate as a voltage source for a low impedance with respect to current components other than the cross current. FIG. 4 is a block diagram, wherein the instantaneous cross current control unit of FIG. 1 is simplified. Referring to the Figure, the symbols 700a, 700b individually represent transfer functions from the voltage command values $V_1^*$, $V_2^*$ of the first and second inverter devices 11, 21 to output voltages. Indicated at 701a, 701b are blocks of the units for preparing the reference output voltages $V^*$ of the first and second inverter devices 11, 21. The following symbols, though some of them have already been used, will be defined.

$V_B$: output bus voltage
$V^*$: output voltage command value
$V_1^*$: first inverter condenser voltage command value
$V_2^*$: second inverter condenser voltage command value
$I_L$: load current
$I_1$: first inverter output current
$I_2$: second inverter output current
$\Delta I_1$: first inverter cross current $(=I_1-I_L/2)$
$\Delta I_2$: second inverter cross current $(=I_2-I_L/2)$
$G_1$: first inverter voltage control system transfer function
$G_2$: second inverter voltage control system transfer function Z: cross current restriction virtual impedance value Next, relational expressions showing the effect of the virtual impedance for restricting the cross current are drawn by use of these symbols.

According to the Kirchoff's law, the following formula is established.

$$I_L = I_1 + I_2 \quad (11)$$

From the formula (11), $\Delta I_1$, $\Delta I_2$ are given by the following formulae:

$$\Delta I_1 = I_1 - I_L/2 = (I_1 - I_2)/2 \quad (12)$$

$$\Delta I_2 = I_2 - I_L/2 = (I_2 - I_1)/2 \quad (13)$$

Hence, $$\Delta I_2 = -\Delta I_1 \quad (14)$$

From FIG. 4 and the formula (14), $V_1^*$, $V_2^*$ are expressed by the following formulae:

$$V_1^* = V^* - Z \times \Delta I_1 \quad (15)$$

$$V_2^* = V^* - Z \times \Delta I_2 = V^* + Z \times \Delta I_1 \quad (16)$$

Based on the definitions of $G_1$, $G_2$, the following formulae are established:

$$V_B = V_1^* \times G_1 \quad (17)$$

$$V_B = V_2^* \times G_2 \quad (18)$$

From the formulae (15)–(18), the following expressions are also established:

$$V_B = V^* \times G_1 - Z \times \Delta I_1 \times G_1 \quad (19)$$

$$V_B = V^* \times G_2 + Z \times \Delta I_1 \times G_2 \quad (20)$$

From the formulae (19)–(20), $\Delta I_1$ is obtained by the following formula:

$$\Delta I_1 = [V^*/Z] \times [(G_1 \times G_2)/(G_1 + G_2)] \quad (21)$$

A result of the formula (19) plus the formula (20) is obtained and divided by 2. Then, the following formula is established:

$$V_B = V^* \times (G_1 + G_2)/2 - Z \times \Delta I_1 \times (G_1 - G_2)/2 \quad (22)$$

From the formula (21), it can be understood that the cross current can be restricted by the virtual impedance Z. Namely, the voltage control system is constructed of, as described above, that of the instantaneous voltage control type, whereby $G_1$, $G_2$ are capable of setting the gain to approximately 1 at the output frequency. Hence the formula (21) becomes as below:

$$\Delta I_1 \approx [V^* \times (G_1 - G_2)]/(2 \times Z) \quad (23)$$

The formula (23) becomes as follows:

$$\Delta I_1 \approx \Delta V/(2 \times Z) \quad (24)$$

where $\Delta V$ is the output voltage difference between the respective first and second inverter devices 11, 21 in the case of the single operation.

For instance, $\Delta V$ is 1%, and Z is selected such as Z=50%. Then, the cross current is given such as $\Delta V/(2 \times Z) = 1/100 = 1\%$.

Next, the formula (23) is substituted into $\Delta I_1$, and the second term of the right side of the formula (22) thereby becomes the following formula:

$$Z \times \Delta I_1 \times [(G_1 - G_2)/2] \approx \{V^* \times (G_1 - G_2)\}^2/(4 \times V^*) = (\Delta V)^2/(4 \times V^*) \quad (25)$$

V is as small as 1%, and it can be therefore considered that $(\Delta V)^2 \approx 0$. Hence, only the first term of the right side is left in the formula (22), resulting in the following formula:

$$V_B \approx V^* \times (G_1 + G_2)/2 \quad (26)$$

From the formula (16), the bus voltage $V_B$ during the parallel operation comes to an output voltage mean value of the respective inverter devices 11, 21 during the single operation, and there is no influence of the virtual impedance value Z.

Z may be any transfer function when having an appropriate impedance for restricting the cross current in the output frequency. For instance, this circuit is a proportional circuit, Z functions as a resistor. If the circuit is a differentiating circuit, Z functions as a reactor. If the circuit is an integral circuit, Z functions as a condenser. If the circuit is a PID (proportional plus integral plus derivative) circuit, Z functions as a resistor plus condenser plus reactor combination circuit. Besides, even in the case of a circuit including a non-linear element such as a sign asymmetric limiter, Z is capable of stably restricting the cross current on condition that it has an appropriate impedance value enough to restrict the cross current in the output frequency.

For simplicity, the vector components of the current and voltage have been ignored in the explanation. However, if the current and voltage are the vector quantities, the same relation is established.

Additionally, if the first and second inverter devices 11, 21 perform the parallel operation only by the virtual impedance, as described above, a cross current given by $\Delta I = \Delta V/(2 \times Z)$ with respect to a voltage difference V therebetween flows between the two inverter devices. An active power component of this cross current is reversibly converted by the inverter devices. Hence, two inverter devices perform the parallel operation with no load, it follows that the active power flows from the DC power supply of one inverter device to the DC power supply of the other inverter device. This active power cross current becomes larger than a loss of the inverter devices. Also, if the DC power supply 5 is incapable of power regeneration as in the case of a thyristor rectifier, the DC voltage rises due to an inflow of this active power. This creates a possibility of an overvoltage.

In accordance with this embodiment, for effecting the stable parallel operation so as not to cause the DC overvoltage by restricting the inflow of the active power described above, there is provided the oscillator 8 common to the inverter devices 11, 21. As will be explained later, the control based on the common clock signals will be executed.

Figure 5:
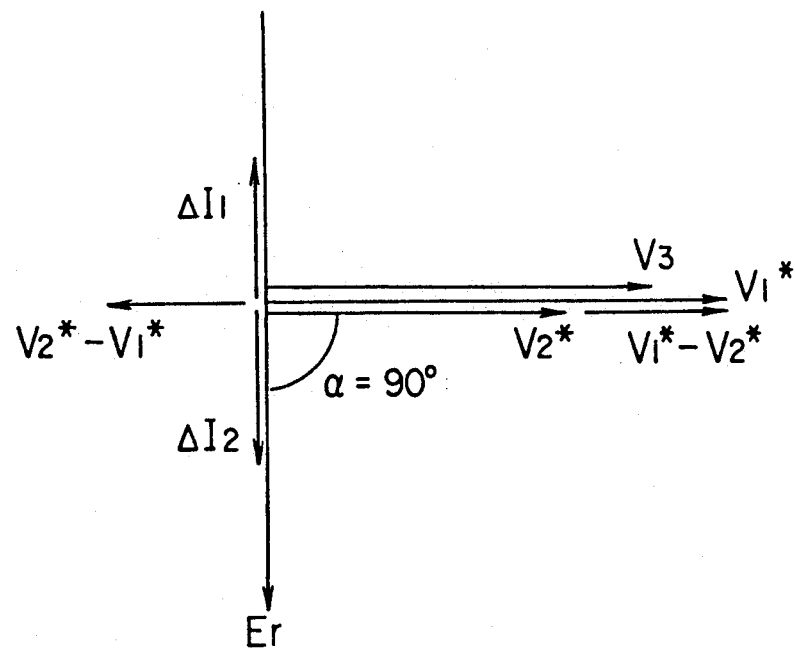
FIG. 5 is a vector diagram of assistance in explaining the principle of the embodiment 1.

From the formula (24), the cross current $\Delta I_1$ is expressed such as $\Delta I_1 \approx \Delta V/(2 \times Z)$. FIG. 5 is a vector diagram showing a case where phases of $V_1^*$, $V_2^*$ are completely coincident, and an absolute value of $V_2^*$ is smaller than an absolute value of $V_1^*$. Z is expressible such as $Z=R+jX$, where R is the resistance component of the virtual impedance Z, and X is the reactance component. An impedance angle $\alpha$ thereof is given by:

$$\alpha = \arg Z = \arctan(X/R) \quad (27)$$

If Z has only the reactance, $R=0$, and $\alpha=90°$.

From this vector diagram, cross current vectors $I_1$, $I_2$ have a component parallel to a virtual voltage vector $E_r$ which is more delayed than the bus voltage vector V by $\alpha=90°$.

From FIG. 5, if the phases of the two voltage command values $V_1^*$, $V_2^*$ are coincident, and when there is only a voltage absolute value difference, it can be comprehended that these cross current vectors $\Delta I_1$, $\Delta I_2$ have a phase difference of $\alpha=90°$ with respect to the load bus voltage vector $V_B$ and has no active component for a reactive component.

Returning to FIG. 1, the explanation will continue. The output voltage of the inverter device 11 is inputted to the adder-subtracter 505 as a feedback voltage of the mean value via the voltage detector 300 and the mean value circuit 410. The output voltage is subtracted therein from the reference voltage outputted from the voltage setting unit 409.

The oscillator 8 common to the inverter devices 11, 21 generates a sine wave signal sinwt defined as a phase reference of the output voltage. The operation is performed by this common clock signal in such a state that the output voltage phases of the respective inverter devices 11, 21 are constantly coincident. Hence, the active component of the cross current substantially becomes zero.

Inputted to the multiplier 407 are the absolute value $|V^*|$ of the reference output voltage outputted from the means value voltage control circuit 408 and the sine wave signal sinwt outputted from the oscillator 8. An output voltage command value $V^* = |V^*| \cdot \text{sinwt}$ is inputted from the multiplier 407 to the subtracter 504a.

The above-described control system of FIG. 1 is exemplified as a single phase inverter. This control system is, however, applicable to a three-phase inverter by providing the same control circuit for every phase or every two phases.

Figure 6:
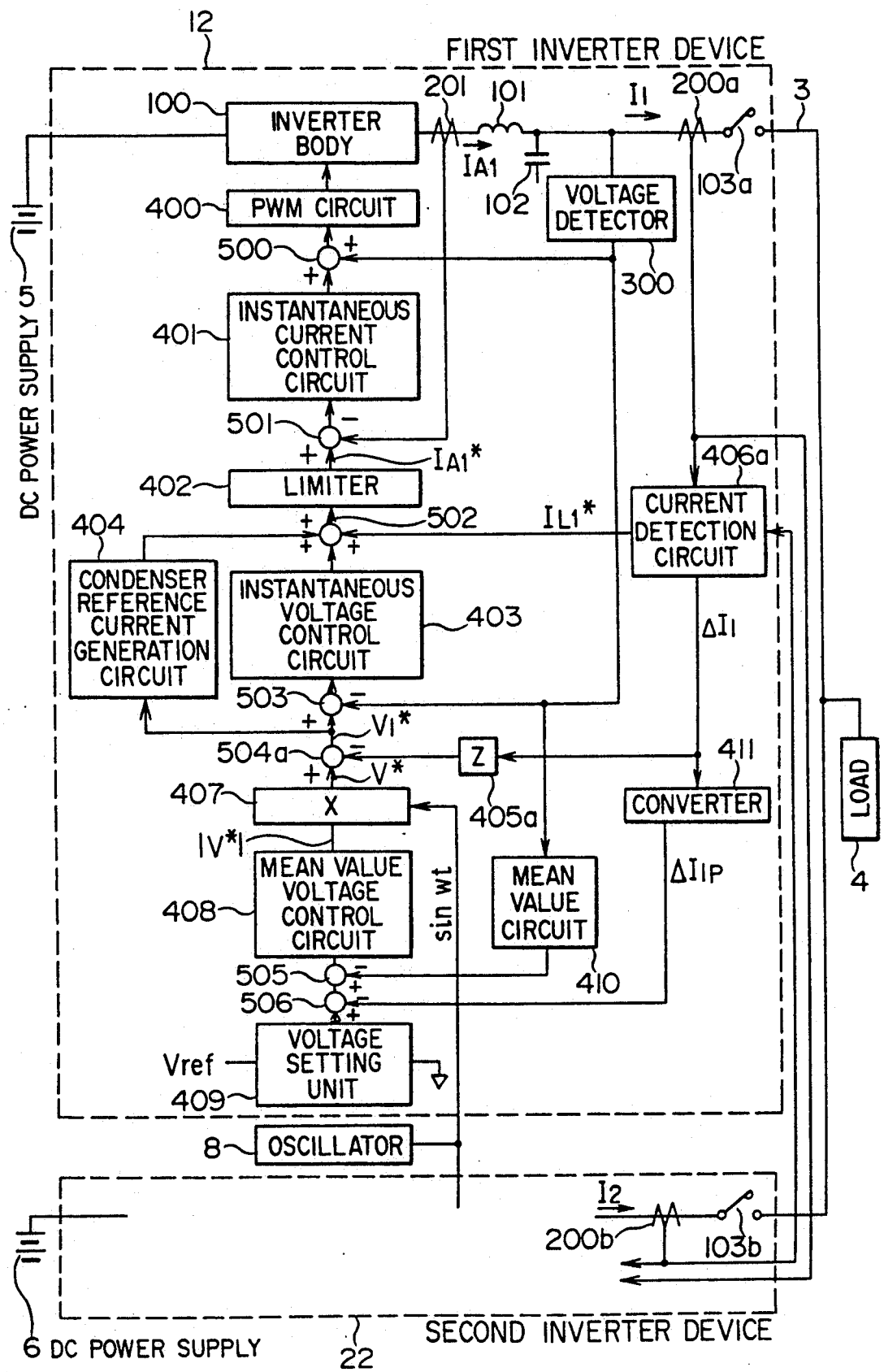
FIG. 6 is a block diagram showing an embodiment 2.

Embodiment 2:

Given next with reference to FIG. 6 is a description of an embodiment 2 wherein the output voltage is controlled by the components derived from the voltage difference of the cross current in addition to the embodiment 1 demonstrated by FIG. 1. Turning to FIG. 6, the same portions as those in FIG. 1 are marked with the line symbols, and the explanation thereof is omitted. The following are new components. Designated at 411 is a converter for converting the cross current $\Delta I_1$ detected by the current detection circuit 406a into a component (active component) $\Delta I_{1p}$ (DC signal) parallel to the virtual voltage vector $E_r$. The converter 411 is composed of a synchronous rectifier circuit or a multiplier and a smoothing filter. Indicated further at 506 is an adder-subtracter for subtracting the foregoing component $I_{1p}$ from the voltage command value given from the setting unit 409.

Figure 7:
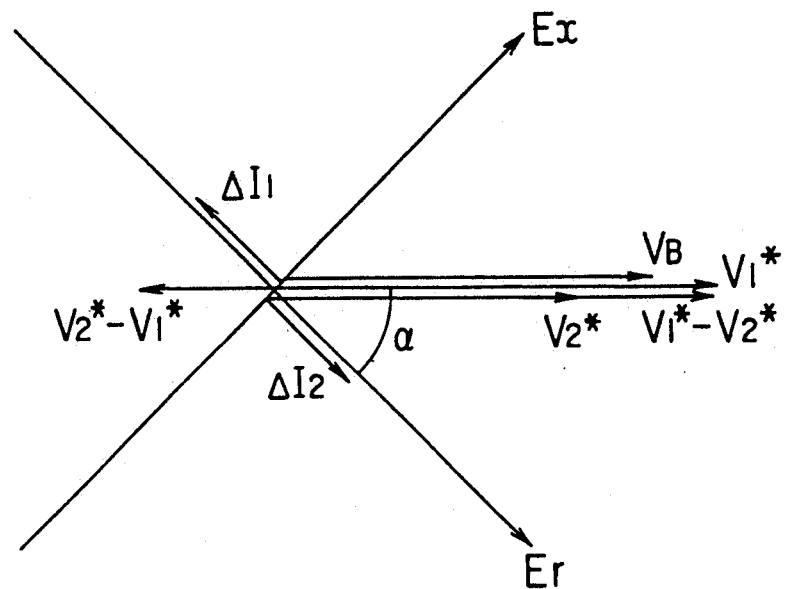
FIG. 7 is a vector diagram of assistance in explaining the principle of the embodiment 2.

Explained next, as similar to the embodiment 1, is the control by the clock signal common to inverter devices 12, 22 for the stable parallel operation so as not to cause the DC overvoltage by restraining the inflow of the active power. The cross current $\Delta I_1$ goes as expressed by the formula (24). FIG. 7 is a vector diagram showing a case where the phases of the voltage command values $V_1^*$, $V_2^*$ are completely coincident, and an absolute value of $V_2^*$ is smaller than an absolute value of $V_1^*$. The virtual impedance can be expressed such as: $Z=R+jX$, where R is the resistance component, and X is the reactance component. An impedance angle thereof is shown in the formula (27).

From the vector diagram of FIG. 7, the cross current vectors $\Delta I_1$, $\Delta I_2$ have a component parallel to the virtual voltage vector $E_r$ which is delayed more than the bus voltage vector $V_B$ by $\alpha$. Then, from FIG. 7, it can be understood that the components, which are derived from the voltage absolute value difference between the two voltage command values $V_1^*$, $V_2^*$ in the respective cross current components $\Delta I_1$, $\Delta I_2$, are equal to the active components of the respective cross current components $\Delta I_1$, $\Delta I_2$ on the basis of the virtual voltage vector $E_r$ obtained by delaying the load bus voltage vector $V_B$ in terms of phase by $\alpha$.

Referring to FIG. 6, a converter 411 converts the cross current $I_1$ detected by the current detection circuit 406a into a component $\Delta I_{1p}$ parallel to the virtual voltage vector $E_r$. The adder-subtracter 506 subtracts the component $\Delta I_{1p}$ from the voltage command value given from the setting unit 409. The subtracted value is inputted as a reference voltage to the mean value voltage control circuit 408. On the other hand, the output voltage of the inverter device 12 is inputted as a feedback voltage of the mean value via the voltage detection circuit 300 and the mean value circuit 410 to the adder-subtracter 505. The output voltage thereof is then subtracted from the reference voltage outputted from the voltage setting unit 409.

The oscillator 8 common to the respective inverter devices 12, 22 generates a sine wave signal sinwt defined as a phase reference of the output voltage. The operation is performed by this common clock signal in such a state that the output voltage phases of the respective inverter devices 12, 22 are invariably coincident.

Inputted to the multiplier 407 are the absolute value $|V^*|$ of the reference output voltage outputted from the mean value voltage control circuit 408 and the sine wave signal sinwt outputted from the oscillator 8. The output voltage command value given by $V^* = |V^*| \cdot \text{sinwt}$ is inputted from the multiplier 407 to the subtracter 504.

As discussed above, the output voltage is controlled by the component $\Delta I_{1p}$, attributed to the voltage absolute value difference between the inverter devices 12, 22, of the cross current $\Delta I_1$. The voltage phases are made coincident by the common clock signal, thereby effecting the control to reduce the cross current. Note that this control may be performed relatively slowly within such a range that the cross current component is not harmful.

Embodiment 3:

Next, an embodiment 3 for effecting the control by dividing the cross current into two orthogonal components will be explained.

Figure 8:
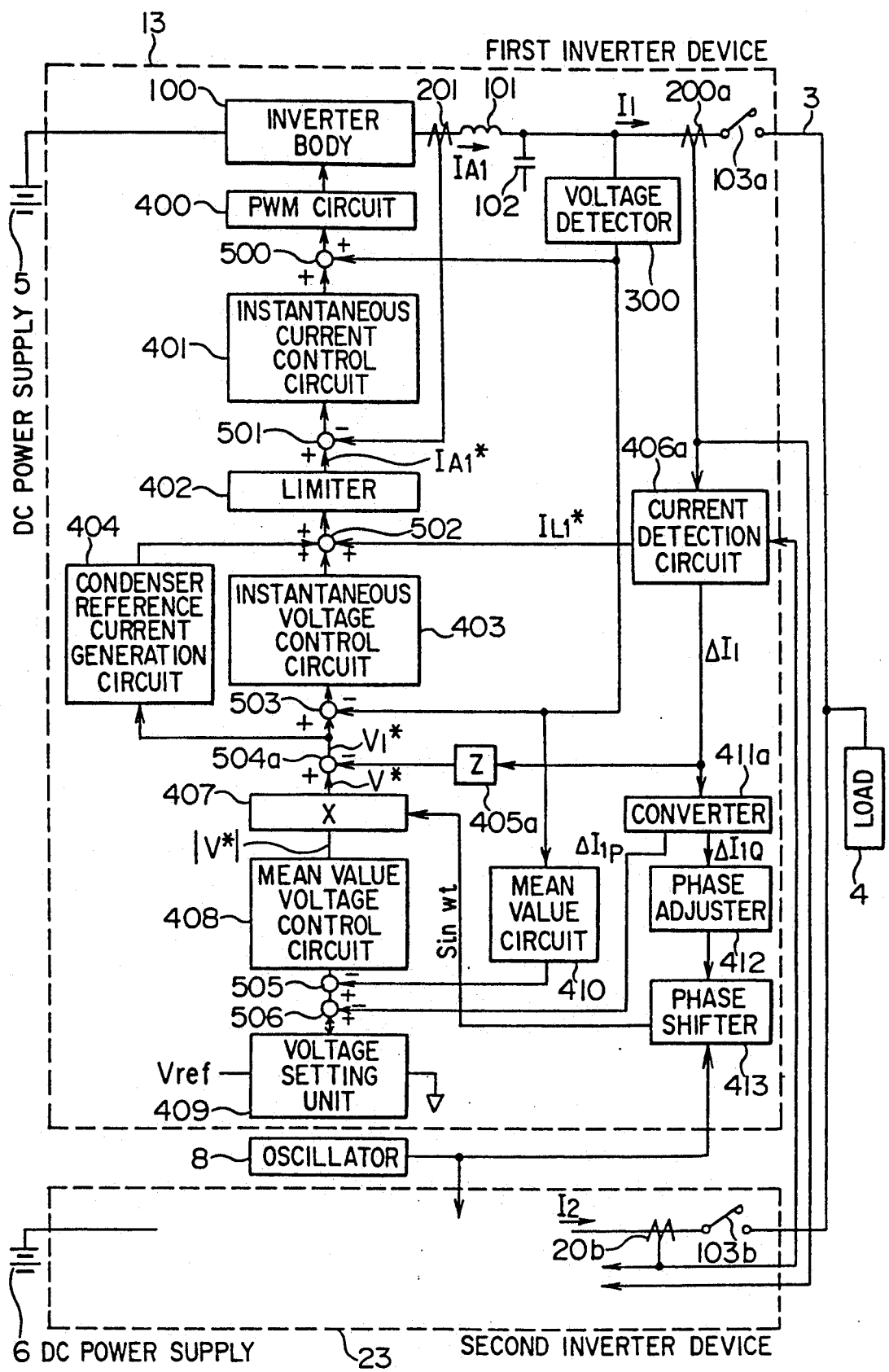
FIG. 8 is a block diagram showing an embodiment 3.

Referring to FIG. 8, the same portions as those in the embodiment 2 are marked with the like symbols, and the description thereof will be omitted. The following are new components. A converter 411a in the embodiment 3 converts the cross current $\Delta I_1$ detected by a current detection circuit 406a into two orthogonal components $\Delta I_{1p}$, $\Delta I_{1Q}$ (DC components). The converter 411a consists of a synchronous rectifier or a multiplier and a smoothing filter. The component $\Delta I_{1P}$ is herein an active component on the basis of the voltage $E_r$, while the component $\Delta I_{1Q}$ is a reactive component on the basis of the voltage $E_r$.

The component $\Delta I_{1Q}$ is led to an input terminal of a phase adjuster 412. A phase signal outputted from the phase adjuster 412 adjusts an output phase of the oscillator 8 with the aid of a phase shifter 413, thereby generating a sine wave signal sinwt serving as a phase reference of the output voltage. As in the same way with the embodiment 2, the output voltage command value expressed by $V^* = |V^*|\cdot \sin wt$ is prepared by this signal in combination with the multiplier 407.

Figure 9:
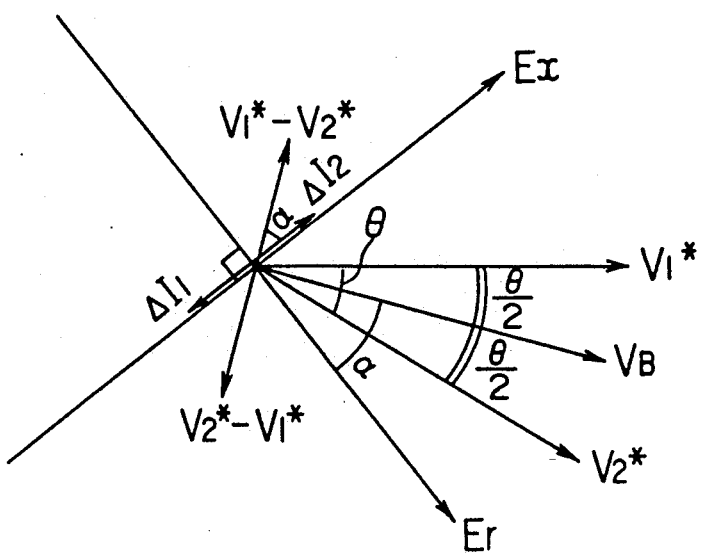
FIG. 9 is a vector diagram of assistance in explaining the principle of the embodiment 3.

FIG. 9 is a vector diagram showing a case where the absolute values of $V_1^*$, $V_2^*$ are identical, and $V_2^*$ is more delayed by a phase angle $\phi$ than $V_1^*$. From this vector diagram, the cross current vectors $I_1$, $I_2$ do not have a component parallel to the virtual voltage vector $E_r$, which is more delayed by (by a) than the bus voltage vector $V_B$, but have a component parallel to another virtual voltage vector $E_X$, which advances through 90° from the virtual voltage vector. Namely, it can be understood that the component derived from the phase difference between the two voltage command values $V_1^*$, $V_2^*$ on the respective cross current components $\Delta I_1$, $\Delta I_2$ is equal to the reactive component of the respective cross current components $\Delta I_1$, $I_2$ based on the virtual voltage vector $E_r$ obtained by delaying the load bus voltage vector $V_B$ by $\alpha$.

Provided, as discussed above, in the embodiment of FIG. 8 is the circuit for controlling the output voltage phase by the cross current component $\Delta I_{1Q}$ generated due to the phase difference between the output voltages which is attributed to slight scatters of the circuits on the downstream sides of the multipliers 407 of the first and second inverter device 13, 23. It is therefore possible to effect the control to reduce the cross current. Note that this control may also be performed relatively slowly.

Figure 10:
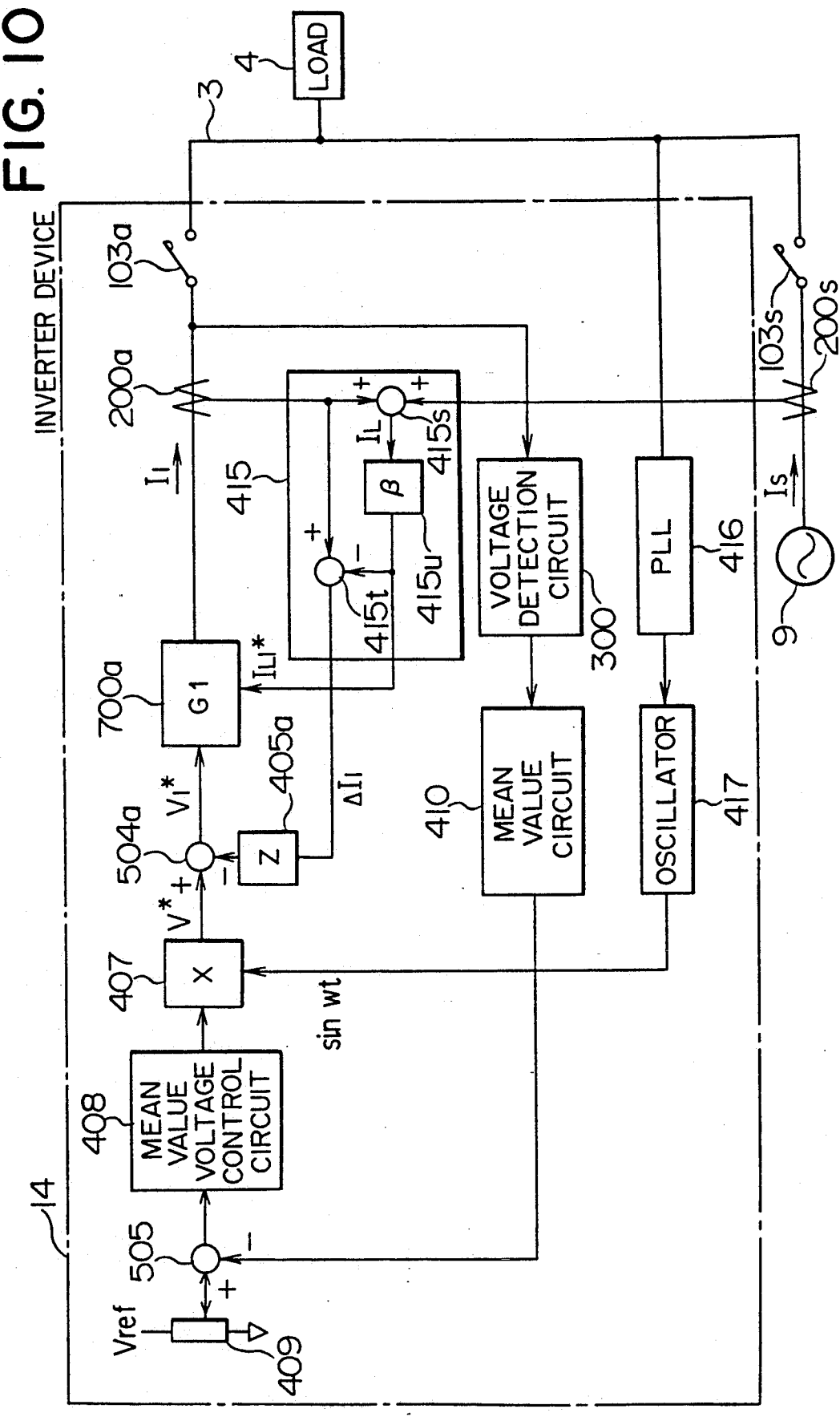
FIG. 10 is a block diagram showing an embodiment 4.

Embodiment 4:

Given next in conjunction with FIG. 10 is an explanation of an embodiment 4 wherein the invention is applied to a system for parallel-operation of the inverter device with other power supply system. FIG. 10 is a block diagram illustrating a construction in which the electric power is supplied to the load 4 while an inverter device 14 and an AC power supply system 9 perform the parallel operation through the output bus 3. Note that substantially the same internal portions of the inverter device 14 as those shown in FIGS. 1 or 4 are simply illustrated.

Designated at 103s in the Figure is a switch on the side of the AC power supply system. The symbol 200s represents a current sensor for detecting a current $I_s$ of the AC power supply system 9; 15 a current sharing circuit for determining the current shared by the inverter device 14; 415s, 415t adders-subtracters; 415u an amplifier circuit having a gain $\beta$ for determining a sharing rate $\beta (0 \leq \beta \leq 1)$ shared by the inverter device 14; 416 a PLL (phase locked loop) circuit synchronizing with the output bus 3; and 417 an oscillator for generating the sine wave signal sinwt on the basis of an output of the PLL circuit.

In the above-described current sharing circuit 415, the adder 415s adds an output current $I_1$ of the inverter device 14 and a current $I_s$ of the AC power supply system 9, thus obtaining a load current $I_L$. This signal is, after being multiplied by $\beta$ in the amplifier circuit 415u, outputted as a load current $I_{L1}^*$ to be shared by the inverter device 14. The inverter device 14 operates, as in the same manner with the embodiment of FIG. 1, to supply the command value $I_{L1}^*$ outputted by the current sharing circuit 415. $\beta$ may be determined from a ratio of a capacity of the inverter device to a capacity of the load. Besides, if continuously varied by a command from outside, sharing of the load current may be sluggishly shifted between the inverter device 14 and the AC power supply system 9.

In this embodiment also, the operation is carried out to cause no voltage phase difference between the inverter device 14 and the AC power supply system 9. Hence, the active component of the cross current $\Delta I_1$ substantially becomes zero and is controlled by the virtual impedance.

In accordance with this embodiment 4, a value of the current flowing to a parallel condenser 102 of the output filter of the inverter is given to the command value of the current minor loop. The controllability is thereby improved. The condenser reference current generation circuit 404 illustrated in FIG. 1 may, however, be omitted. It is because the voltage control circuit 403 operates to make the output voltage of the first inverter device 11 coincident with the output reference voltage $V_1^*$; a result of which the signal substituting for the condenser reference current signal is generated; and the circuit 403 operates as a control system for the sine wave inverter without causing any obstacle. In this case, the deviation in the voltage control becomes less with a well larger amplification rate of the voltage control circuit 403.

Further, in the explanation given above, the virtual impedance Z contains only the reactance component, but $\alpha$ may be set within such a range that the active component of the cross current is not harmful. Besides, if the impedance exists in the parallel portion of the main circuit, Z may be selected to decrease the active component of the cross current including this impedance.

Figure 11:
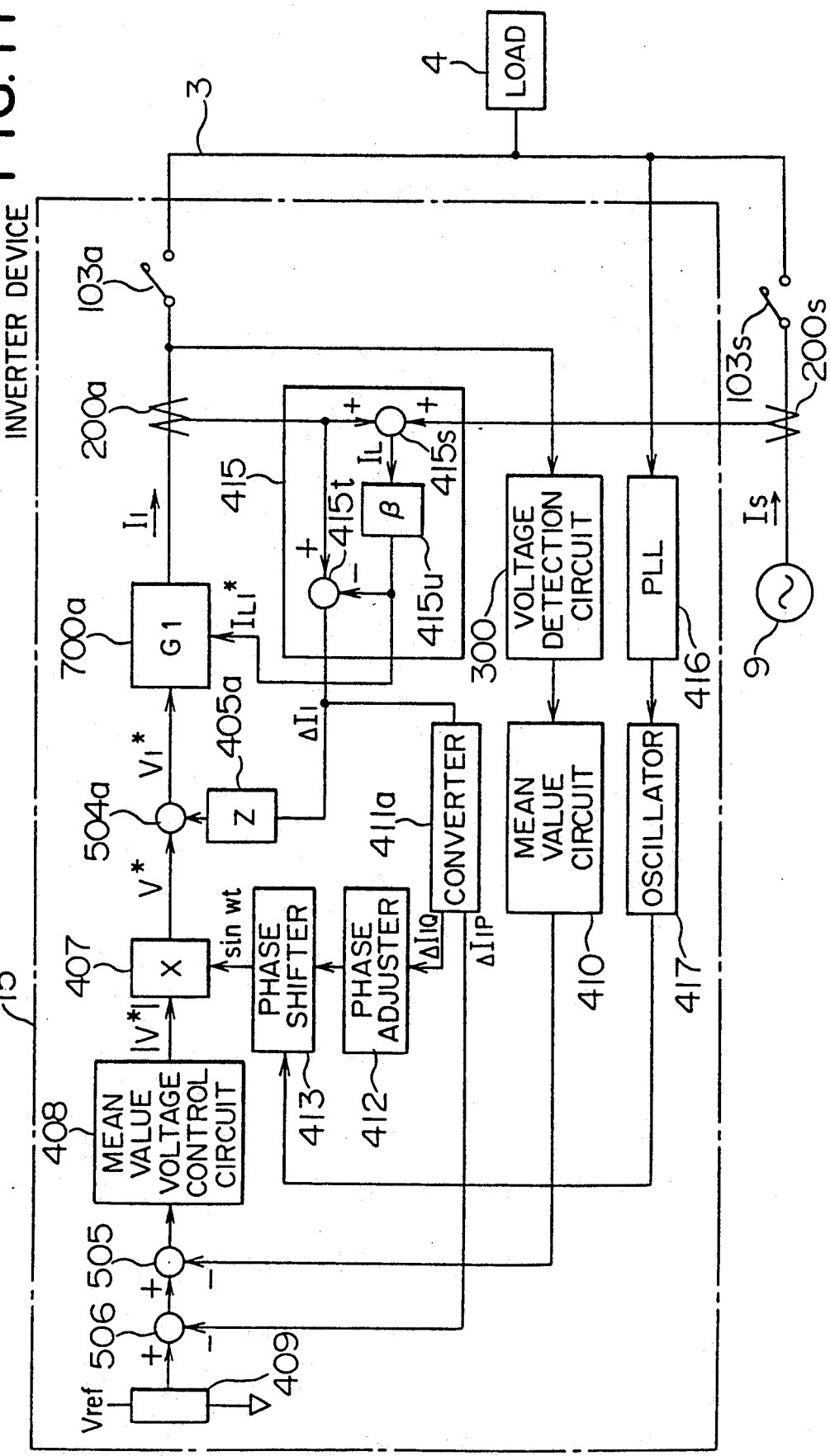
FIG. 11 is a block diagram showing an embodiment 5.

Embodiment 5:

Described next with reference to FIG. 11 is an embodiment 5 for controlling the output voltage by the component attributed to the voltage difference of the cross current and also effecting the phase control by the component derived from the phase difference. FIG. 11 is a block diagram illustrating a construction in which the electric power is supplied to the load 4 while an inverter device 15 and the AC power supply system 9 perform the parallel operation through the output bus 3. Note that substantially the same internal portions of the inverter device 15 as those of FIG. 6 or 8 are simply illustrated. The following are new components. A converter 411a in the embodiment 5 converts the cross current $I_1$ from the current sharing circuit 415 into two orthogonal components $\Delta I_{1P}$, $\Delta I_{1Q}$ (DC components). The converter 411a consists of a synchronous rectifier or a multiplier and a smoothing filter. The component $\Delta I_{1P}$ is herein an active component on the basis of the voltage $E_r$, while the component $\Delta I_{1Q}$ is a reactive component on the basis of the voltage $E_r$.

The component $\Delta I_{1Q}$ is led to an input terminal of a phase adjuster 412. A phase signal outputted from the phase adjuster 412 adjusts an output phase of the oscillator 8 with the aid of a phase shifter 413, thereby generating a sine wave signal sinwt serving as a phase reference of the output voltage. As in embodiment 3, the output voltage command value expressed by $V^* = |V^*|\cdot \sin wt$ is prepared by this signal in combination with the multiplier 407.

Therefore, in the parallel operation system of the inverter device 15 and the AC power source system 9, the output voltage phase is controlled by the component $\Delta I_{1Q}$ attributed to the phase difference of the cross current $\Delta I_1$. The voltage is controlled by the component $\Delta I_{1P}$ derived from the voltage absolute value difference. The control can be thereby performed to reduce the cross current. Note that this control may be executed slowly in such a range that the cross current component is not harmful.

It is to be noted that the description has dealt with the case where the control circuit takes an instantaneous voltage control type of construction having the current minor loop. If the voltage control system is capable of controlling the output voltage at a high speed even when having no current minor loop, the stable parallel operation of the AC output inverter can be performed by adding a cross current restriction virtual impedance circuit.

Figure 12:
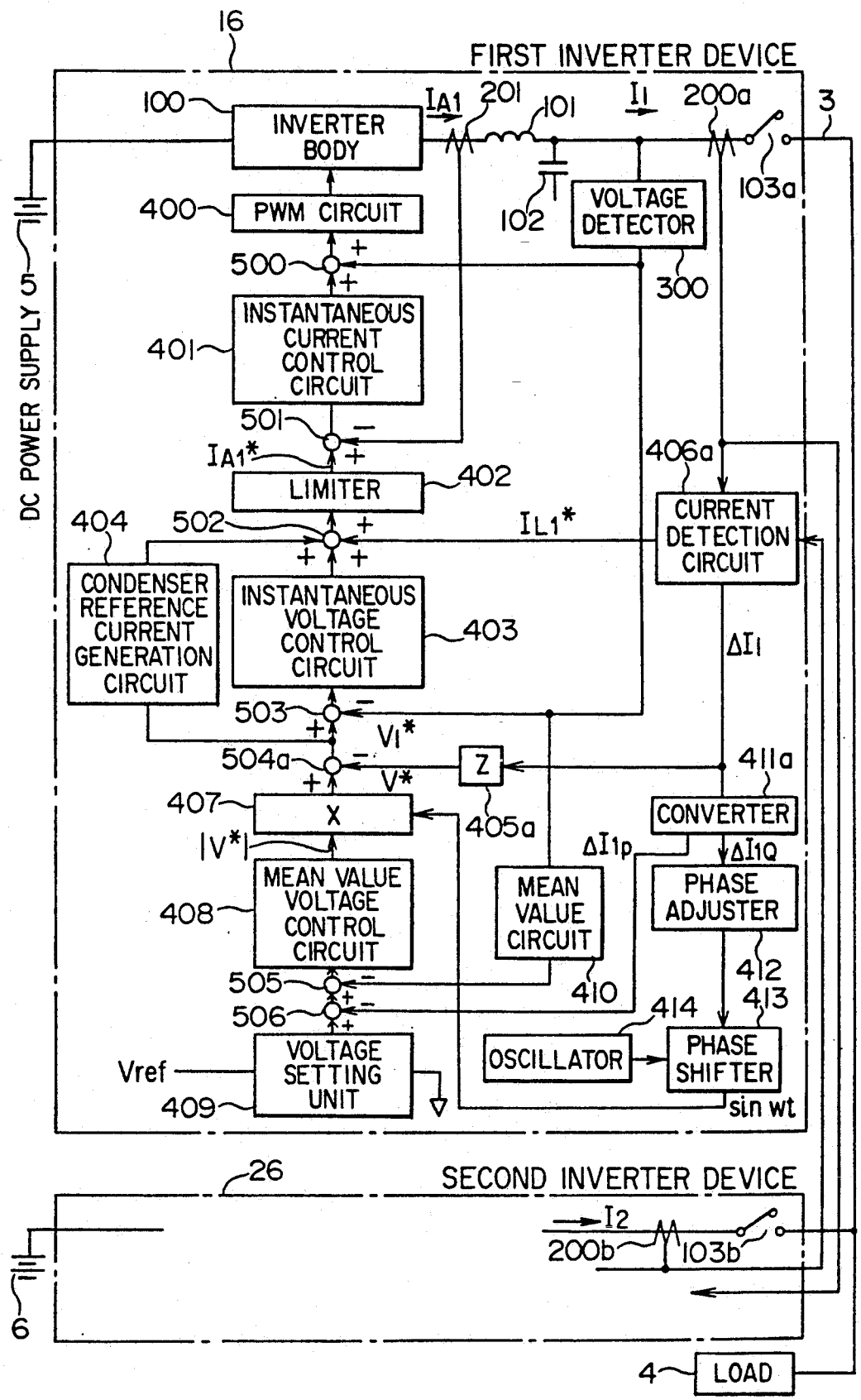
FIG. 12 is a block diagram showing an embodiment 6.

Embodiment 6:

Explained next in conjunction with FIG. 12 is an embodiment 6 for controlling the output voltages of the respective inverter devices to restrain the cross current component of the electric current by a detection signal obtained when detecting the cross current of the electric current flowing between the inverter devices as a first component derived mainly from the phase difference between the inverter devices and as a second component attributed chiefly to the voltage difference between the inverter devices.

Turning to FIG. 12, the same portions as those of FIG. 1 are marked with the like symbols, and the description thereof will be omitted. The following are new components. Designated at 411a is a converter for separating the cross current detected by the current detection circuit 406a into a component parallel to the output voltage vector of an inverter device 16 and a component vertical thereto. The numeral 412 denotes a phase adjuster; 413 a phase shifter; and 414 an oscillator. The oscillator 8 for supplying the common clock in FIG. 1 is not provided. Instead, separate oscillators are incorporated into the first inverter device 16 and a second inverter device 26, respectively. Further, the current detection circuit 406a has the same construction as that shown in FIG. 3.

The operation will next be explained. In accordance with embodiment 6, as with embodiment 1, the inverter devices 16, 26 are protected from the overcurrent by their current minor loops. Besides, the output voltage can be invariably kept in the sine wave by quickly following up the distortion and abrupt change in the load current. The control described above is effected for every switching of the high frequency PWMs of the inverter devices. Hence, the response is very fast, and an excellent control performance is attainable.

By the way, if the first and second inverter devices 16, 26 perform the parallel operation only by the virtual impedance, a cross current given by $\Delta I = \Delta V/(2 \times Z)$ with respect to a voltage difference $\Delta V$ therebetween flows between the two inverter devices. An active power component of this cross current is reversibly converted by the inverter devices. Hence, two inverter devices perform the parallel operation with no load, it follows that the active power flows from the DC power supply of one inverter device to the DC power supply of the other inverter device. If the DC power supply 5 is incapable of power regeneration as in the case of a thyristor rectifier, the DC voltage rises due to an inflow of this active power. There is a possibility to cause an overvoltage.

Next, in accordance with embodiment 6 is explained the control for effecting the stable parallel operation so as not to cause the DC overvoltage by restricting the inflow of the active power.

From the formula (24), the cross current $\Delta I_1$ is expressed such as $\Delta I_1 = \Delta V/(2 \times Z)$. As described above, FIG. 9 is a vector diagram showing a case where the absolute values of the voltage command values of $V_1^*$, $V_2^*$ are completely coincident, and $V_2^*$ is more delayed than $V_1^*$ by a phase angle $\theta$. The virtual impedance Z is expressible such as $Z = R + jX$, where R is the resistance component of the virtual impedance Z, and X is the reactance component. An impedance angle $\alpha$ thereof is, as similar to formula (27), given by: $\alpha = \arg Z = \arctan(X/R)$. From this vector diagram, the cross current vectors $\Delta I_1$, $\Delta I_2$ have no component parallel to the virtual voltage vector $E_r$, which is more delayed than the bus voltage vector $V_B$ by $\alpha$, but only have the component parallel to another virtual voltage vector $E_X$ which advances through 90° from the former virtual voltage vector.

Further, FIG. 7 is a vector diagram showing the case where there is, as explained above, no phase difference between the voltage command values $V_1^*$, $V_2^*$, and the absolute value of $V_2^*$ is smaller than the absolute value of $V_1^*$. From this vector diagram, the cross current vectors $I_1$, $I_2$ have only the component parallel to virtual voltage vector $E_r$, which is more delayed than the bus voltage vector $V_B$ by $\alpha$, but have no component parallel to $E_X$. From FIGS. 7 and 9, it can be comprehended that the component derived from the phase difference between $V_1^*$ and $V_2^*$ in the respective cross current components $\Delta I_1$, $\Delta I_2$ is defined as a component parallel to the virtual voltage vector $E_r$) parallel to the virtual voltage vector $E_r$ of the cross current vectors. Namely, the component attributed to the phase difference between the two voltage command values $V_1^*$, $V_2^*$ in the respective cross current components $I_1$, $I_2$ is the reactive component of the respective cross current components $\Delta I_1$, $\Delta I_2$ on the basis of the voltage $E_X$ obtained by advancing the phase of the load bus voltage vector $V_B$ through $90° - \alpha$.

Further, it can be similarly understood that the component attributed to the voltage absolute value difference between the two voltage command values $V_1^*$, $V_2^*$ in the respective cross current components $\Delta I_1$, $\Delta I_2$ is equal to the active component of the respective cross current components $\Delta I_1$, $\Delta I_2$ on the basis of the virtual voltage vector $E_r$ of these cross current vectors.

Turning back to FIG. 12, the explanation will continue. A converter 411a in the embodiment 3 converts the cross current $I_1$ detected by a current detection circuit 406a into two orthogonal components $\Delta I_{1P}$, $\Delta I_{1Q}$ (DC components). The converter 411a consists of a synchronous rectifier or a multiplier and a smoothing filter. The component $\Delta I_{1P}$ is an active component on the basis of the voltage $E_r$, while the component $\Delta I_{1Q}$ is a reactive component on the basis of the voltage $E_r$.

The adder-subtracter 506 substracts the component $\Delta I_{1P}$ from the voltage command value given from the setting unit 409, and this component is inputted to the mean value voltage control circuit 408 as a reference voltage. On the other hand, the output voltage of the inverter device 16 is inputted as a means value feedback voltage to the adder-subtracter 506 via the voltage detector 300 and the means value circuit 410, wherein the output voltage is subtracted from the reference voltage.

The component $\Delta I_{1Q}$ is led to an input terminal of a phase adjuster 412. A phase signal outputted from the phase adjuster 412 adjusts an output phase of the oscillator 8 with the aid of a phase shifter 413, thereby generating a sine wave signal sinwt serving as a phase reference of the output voltage.

Inputted to the multiplier 407 are the absolute value $|V^*|$ of the output reference voltage outputted from the mean value voltage control circuit 408 and the sine wave signal sinwt outputted from the phase shifter 413. The output voltage command value given by $V^* = |V^*|$. sinwt is then outputted. This signal $V^*$ is inputted to the subtracter 504a.

As described above, the output voltage phase is controlled by the component $\Delta I_{1Q}$, derived from the phase difference between the inverter devices 16, 16, of the cross current $\Delta I_1$. The voltage is also controlled by the component $\Delta I_{1P}$ attributed to the voltage absolute value difference. The control is thereby effected to reduce the cross current. Note that this control may be performed relatively slowly within such a range that the cross current component is not harmful.

The control system explained referring to FIG. 12 is exemplified as a single phase inverter. This control system is, however, applicable to a three-phase inverter by providing the same control circuit for every or two phases.

A simplified explanation has been given above, wherein the two inverter devices having the same capacity are provided. The invention is, however, applicable to the parallel operation of n-sets of inverter devices having different capacities. In this case, all the inverter devices may be constructed to share the load in proportion to the capacities.

Figure 13:
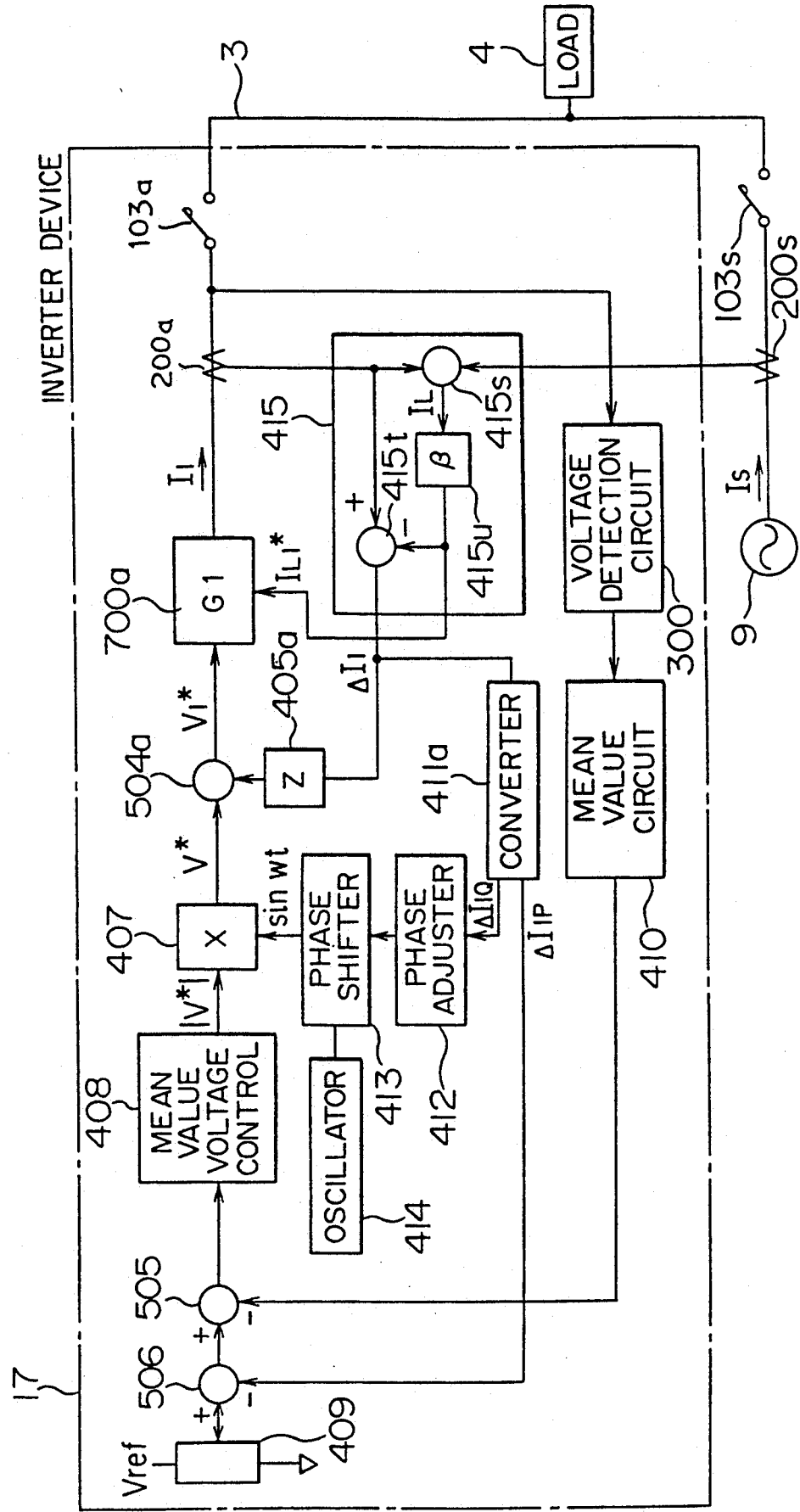
FIG. 13 is a block diagram showing an embodiment 7.

Embodiment 7:

Given next in conjunction with FIG. 13 is an explanation of an embodiment 7 wherein the invention is applied to a system for parallel-operating the inverter device and other power supply system. FIG. 13 is a block diagram illustrating a construction in which the electric power is supplied to the load 4 while an inverter device 17 and an AC power supply system 9 perform the parallel operation through the output bus 3. Note that substantially the same internal portions of the inverter device 17 as those shown in FIGS. 1 and 12 or 4 are simply illustrated.

In the current sharing circuit 415, the adder 415s adds an output current $I_1$ of the inverter device 17 and a current $I_s$ of the AC power supply system 9, thus obtaining a load current $I_L$. This signal is, after being multiplied by $\beta$ in the amplifier circuit 415u, outputted as a load current $I_{L1}^*$ to be shared by the inverter device 17. The inverter device 17 operates, as in the same manner with the embodiments of FIGS. 1 and 12, to supply the command value $I_{L1}^*$ outputted by the current sharing circuit 415. $\beta$ may be determined from a ratio of a capacity of the inverter device to a capacity of the load. Besides, if continuously varied by a command from outside, sharing of the load current may be sluggishly shifted between the inverter device 14 and the AC power supply system 9.

In this embodiment also, the cross current $\Delta I_1$ between the inverter device 17 and the AC power supply system 9 is controlled substantially to zero by the control of the virtual impedance Z, $\Delta I_{1P}$ and $\Delta I_{1Q}$.

Embodiment 8:

The description given above has dealt with the case where the present invention is applied to the parallel operation of the inverters. However, other inverters may be applicable. The same principle is applicable to, for example, as illustrated in FIG. 14, an inverter capable of the instantaneous voltage control such as a high frequency link type inverter for converting the direct current into a high frequency rectangular wave and further a low frequency sine wave by combining a high frequency inverter with a cycloconverter.

Figure 14:
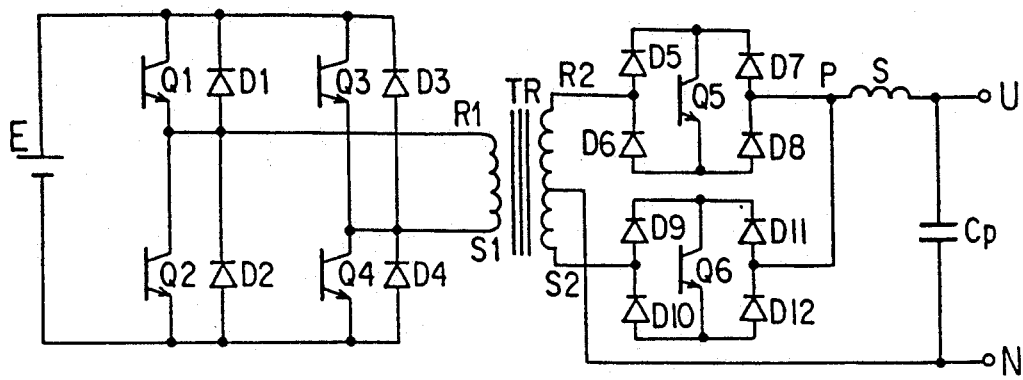
FIG. 14 is a circuit diagram depicting an inverter used in an embodiment 8.
Figure 15:
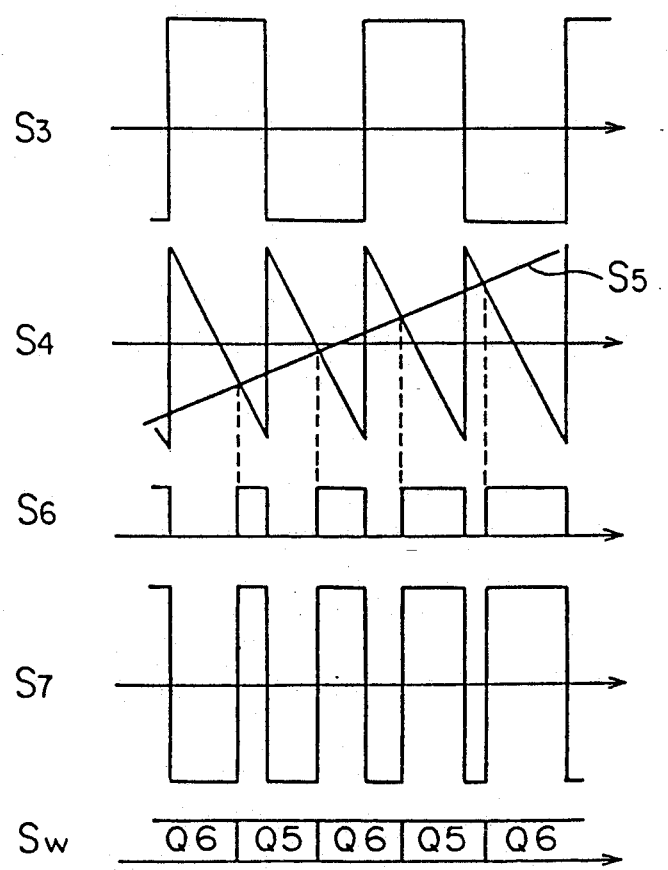
FIG. 15 is a timing chart showing the operation of the inverter of the embodiment 8.

In the inverter depicted in FIG. 14, a rectangular wave $S_3$ shown in FIG. 15 is obtained on the secondary side of a transformer TR by switching from a transistor Q1 to a transistor Q4. Formed next are sawtooth waves $S_4$ synchronizing with switching of the inverter. Obtained also are signals $S_6$ which are turned ON/OFF at cross points of the sawtooth waves and the output voltage command signals $S_5$. One of switches Q5, Q6 of the cycloconverter is selected based on a polarity of a voltage RS of the inverter as well as on the signal $S_6$. A voltage signal $S_7$ corresponding to the signal $S_5$ is obtainable between U and N in FIG. 14.

As obvious from the explanation given above, the circuit of FIG. 14 is capable of obtaining the single phase PWM voltage equivalent to that of the circuit illustrated in FIG. 2B. Further, in the case of the three-phase output, there may be used a three-phase high frequency link inverter using three sets of circuits on the secondary side of the transformer TR of FIG. 14.

In the respective embodiments discussed above, the orthogonal components $\Delta I_{1P}$, $\Delta I_{1Q}$ of the cross current are detected in separation from the cross current $\Delta I_1$. However, the output current $I_1$ and the load current to be shared are separated into orthogonal components $I_{1P}$, $I_{1Q}$, $I_{L1}^*{}_P$, $I_{L1}^*{}_Q$. The orthogonal components of the cross current may be detected from the following formulae:

$$\Delta I_{1P} = I_{1P} - I_{L1}^*{}_P$$

$$\Delta I_{1Q} = I_{1Q} - I_{L1}^*{}_Q$$

Figure 16:
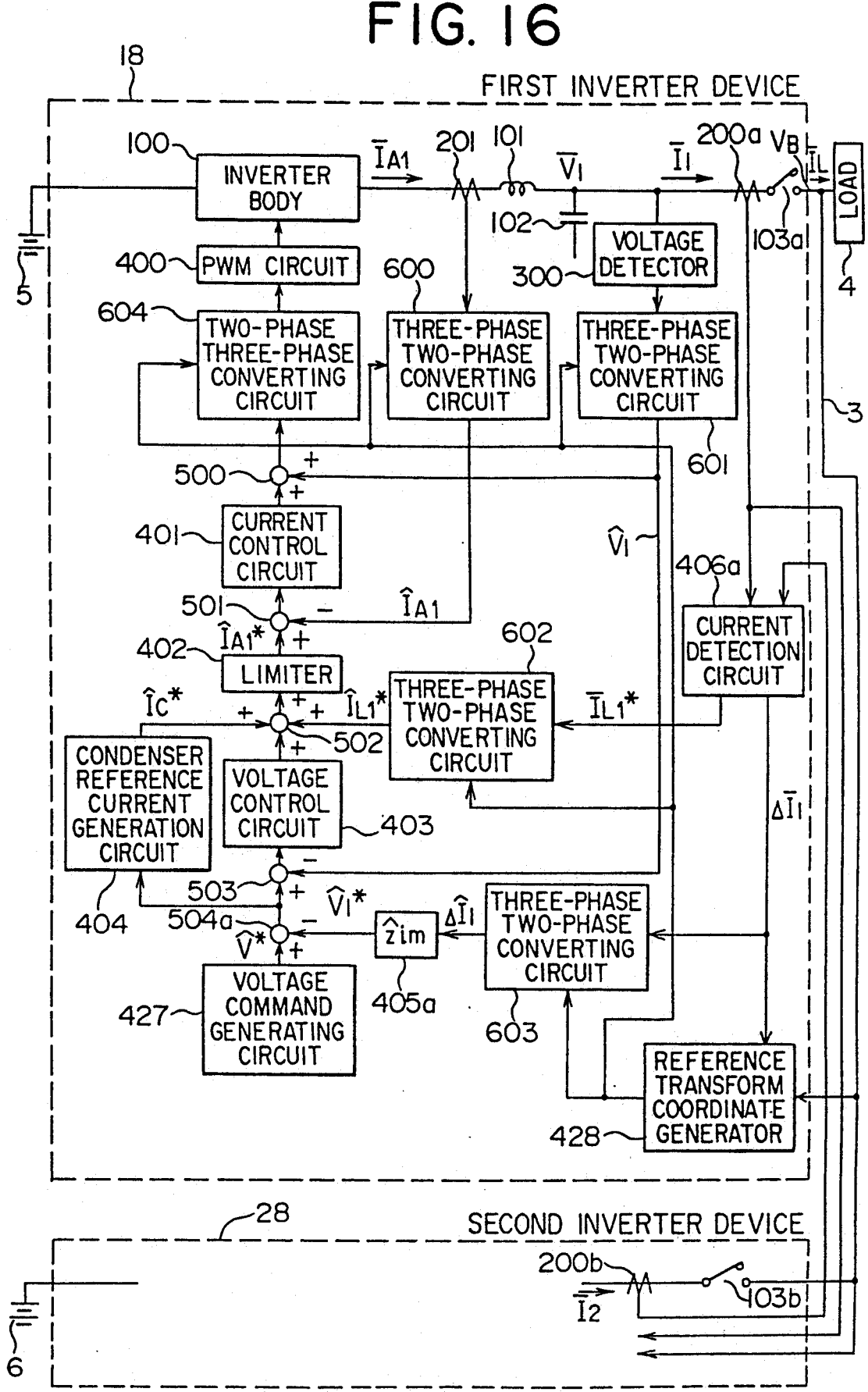
FIG. 16 is a block diagram illustrating an embodiment 9.

Embodiment 9:

Explained in conjunction with FIG. 16 is an embodiment 9, wherein the present invention is applied to a control system using a synchronous rotational coordinate system based on a d-q axis and capable of obtaining more excellent characteristics in the case of a three-phase inverter or converter. Referring to FIG. 16, a symbol — placed above the letter represents a matrix showing a three-phase output signal. The symbol $\wedge$ placed thereabove represents a matrix showing a signal on the synchronous rotational coordinate based on the d-q axis. For instance, the voltage V is expressed by the following formulae:

$$\overline{V} = col\ [Vu.\ Vv.\ Vw] \qquad (28)$$

$$\hat{V} = col\ [Vd.\ Vq] \qquad (29)$$

An inverter device 18 in this embodiment 9 has almost the same construction with the inverter device 11 in the embodiment 1 demonstrated by FIG. 1. Referring to FIG. 16, the circuits marked with the same reference numerals as those of FIG. 1 exhibit the same functions with the corresponding circuits in FIG. 1. In accordance with this embodiment 9, however, the individual circuits perform the operations corresponding to two-phase or three-phase signals.

An inverter body generally designated at 100 is composed of self arc-suppressing elements such as, e.g., transistors or MOSFETs capable of performing high frequency switching. Respective arms of a three-phase bridge inverter shown in FIG. 2A are switched at a frequency which is approximately ten times through several hundreds of times as high as an output frequency (e.g., 60 Hz). The inverters serve to convert a DC voltage into a high-frequency AC voltage assuming a rectangular waveform including a sine fundamental wave. The numerals 101, 102 represent a reactor and a condenser, constituting a low-pass filter, for removing harmonics from the high-frequency AC voltage assuming the rectangular waveform and generated by the inverter body 100, and for obtaining a sine wave output voltage. The reactor and the condenser are connected to the output bus 3 through an output switch 103a.

A current sensor 200a detects an output current $\overline{I}_1$ of the first inverter device 18, while a current sensor 201 detects an output current $\overline{I}_{A1}$ of the inverter body 100. Indicated at 300 is a voltage sensor for detecting a voltage $\overline{V}_1$ of the condenser 102, i.e., an output bus voltage during the parallel operation.

A PWM circuit 400 for determining a timing of switching of the inverter body 100 is, e.g., a triangular wave comparison PWM circuit makes the inverter body 100 perform switching at a cross point of a voltage command signal for a fundamental wave to be outputted from the inverter body 100 and a triangular wave carrier. A current control circuit 401 controls the output current $\overline{I}_{A1}$ of the inverter body 100. A limiter circuit 402 limits an output current command value of the inverter body 100. A voltage control circuit 403 controls a voltage $\overline{V}_1$ of the condenser 102. A condenser reference current generation circuit 404 outputs a current value to be supplied to the condenser 102 in order to generate a desired output voltage. A virtual impedance circuit 405a causes an operation to restrict a cross current by virtually inserting an impedance Z between the first and second inverter devices, 18, 28. A current detection circuit 406a detects a cross current outputted by the first inverter device 18 and a value of load current to be shared. Designated at 427 is a circuit for generating an output voltage command value of the first inverter device 18. The numeral 428 denotes a reference transform coordinate generator for creating a synchronous rotational coordinates.

Further, the numerals 500, 501, 502, 503, 504a represent adders-subtracters; 600, 601, 602, 603 three-phase/two-phase converting circuits for converting three-phase (U, V, W) signals into signals on the synchronous rotational coordinates based on the d-q axis; and 604 a two-phase/three-phase converting circuit for converting the signals on the synchronous rotational coordinates based on the d-q axis into the three-phase (U, V, W) signals.

An output of the second inverter device 28 assuming the same construction with the first inverter device 18 is connected in parallel with the first inverter device 18 via the output bus 3. Indicated at 103b is an output switch of the second inverter device 28. The symbol 200b represents a current sensor for detecting the output current $\overline{I}_2$ of the second inverter device 28.

Figure 17:
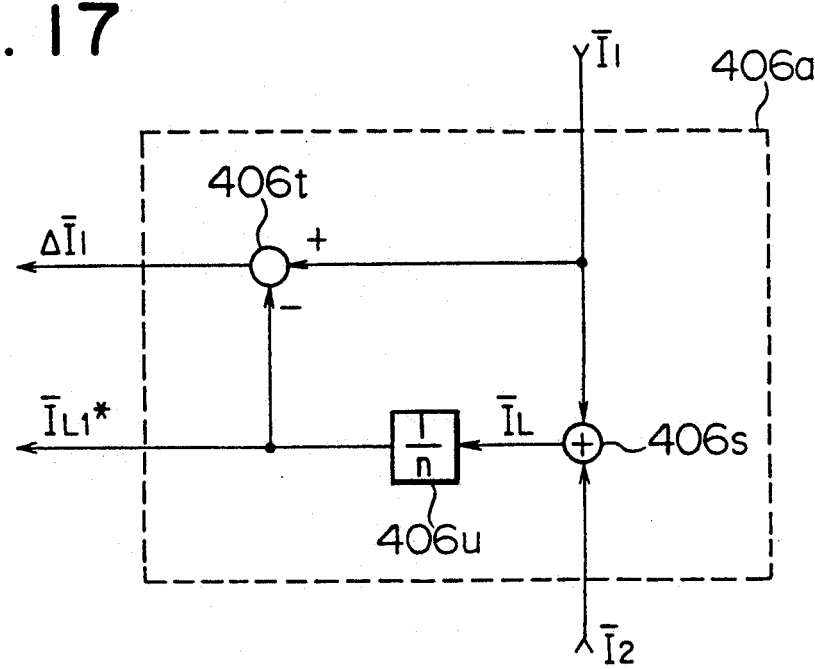
FIG. 17 is a block diagram depicting a current detection circuit used in the embodiment 9.

Further, FIG. 17 is a block diagram fully illustrating the current detection circuit 406a. The symbols 406s, 406t denote adders-subtracters. An amplifier circuit 406u has a gain of 1/n when the number of inverter devices is set to n. The adder 406s adds the output current $\overline{I}_1$ of the first inverter device 18 and the output current $\overline{I}_2$ of the second inverter device 28, thereby obtaining a load current $I_L$. A signal thereof is inputted to the amplifier circuit 406u. A value of $I_L/n$ is obtained by dividing the load current $\overline{I}_L$ by the parallel number n (n=2 in this case). This value is outputted as a load current $\overline{I}_{L1}{}^*$ to be shared by the first inverter device 18. Further, the subtracter 406t arithmetically outputs a difference between the output current $I_1$ of the first inverter device 18 and the current $I_{L1}{}^*$ to be shared, i.e., a cross current $\overline{\Delta I}_1$.

Next, the operation will be explained. The description starts with touching on a relation between the three-phase signals and the signals on the synchronous rotational coordinates and a coordinate transform as well.

The reference transform coordinate generator 428 generates the following six three-phase sine wave signals serving as references for the coordinate transform.

$$\left.\begin{array}{l} S_u = \sqrt{\tfrac{2}{3}}\ \sin(\omega t + \phi) \\ S_v = \sqrt{\tfrac{2}{3}}\ \sin(\omega t - \tfrac{2}{3}\pi + \phi) \\ S_w = \sqrt{\tfrac{2}{3}}\ \sin(\omega t + \tfrac{2}{3}\pi + \phi) \end{array}\right\} \quad (30)$$

$$\left.\begin{array}{l} C_u = \sqrt{\tfrac{2}{3}}\ \cos(\omega t + \phi) \\ C_v = \sqrt{\tfrac{2}{3}}\ \cos(\omega t - \tfrac{2}{3}\pi + \phi) \\ C_w = \sqrt{\tfrac{2}{3}}\ \cos(\omega t + \tfrac{2}{3}\pi + \phi) \end{array}\right\} \quad (31)$$

(Normally, however, $\phi = 0$)

If the three-phase output signals from the current sensor 301, the current detection circuit 406a and the voltage sensor 300 are expressed representatively by $\overline{X}$, and when these signals are multiplied by the next transform matrix $\overline{C}$, the signals are converted into DC signals $\overset{\wedge}{X}$ on the d-q axis.

$$\overline{X} = \mathrm{col}[Xu.Xv.Xw] \quad (32)$$

$$\overset{\wedge}{X} = \mathrm{col}[Xd.Xq] \quad (33)$$

$$\overline{C} = \begin{pmatrix} Su & Sv & Sw \\ Cu & Cv & Cw \end{pmatrix} \quad (34)$$

$$\overset{\wedge}{X} = \begin{pmatrix} Xd \\ Xq \end{pmatrix} = \overline{C} \cdot \overline{X} = \begin{pmatrix} Su & Sv & Sw \\ Cu & Cv & Cw \end{pmatrix}\begin{pmatrix} Xu \\ Xv \\ Xw \end{pmatrix} \quad (35)$$

The result of control arithmetic effected on the d-q axis is multiplied by the next reverse transform matrix, whereby it is returned again to the three-phase system and imparted to the PWM circuit 400.

$$\overline{C}^{-1} = \begin{pmatrix} Su & Cu \\ Sv & Cv \\ Sw & Cw \end{pmatrix} \quad (36)$$

In the case of executing such a transform, the output command voltage $\overline{V}^*$ is given by:

$$\overline{V}^* = \sqrt{2E} \begin{pmatrix} \sin\omega t \\ \sin(\omega t - \tfrac{2}{3}\pi) \\ \sin(\omega t + \tfrac{2}{3}\pi) \end{pmatrix} \quad (37)$$

A value on the d-q axis is expressed by the following formula:

$$\hat{V}^* = \begin{pmatrix} Vd^* \\ Vq^* \end{pmatrix} = \overline{C} \cdot \overline{V}^* = \begin{pmatrix} \sqrt{3}E \\ 0 \end{pmatrix} \quad (38)$$

Further, where $C_P$ is the capacity of the condenser 102, a command current $\hat{I}_C^*$ to be flowed thereto is expressed such as:

$$\hat{I}_C^* = \begin{pmatrix} Icd^* \\ Icq^* \end{pmatrix} = \overline{C} \cdot \overline{I}_C^* \quad (39)$$

$$= \overline{C}\sqrt{2}\,\omega C_P E \begin{pmatrix} \cos\omega t \\ \cos(\omega t - \tfrac{2}{3}\pi) \\ \cos(\omega t + \tfrac{2}{3}\pi) \end{pmatrix}$$

$$= \begin{pmatrix} 0 \\ \sqrt{3}\,\omega C_P E \end{pmatrix}$$

As described above, the three-phase reference output voltage and the condenser reference current become a DC constant value on the d-q axis. The control on the three-phase coordinates of U, V, W is defined as follow-up control, and hence an error tends to occur even in a steady state. In contrast, the control on the d-q axis is defined as constant-value control, and therefore the control essentially having a less amount of error is attainable.

Next, the instantaneous voltage control of the inverter will be explained.

The respective inverter devices 18, 28 are provided with current minor loops. The current control circuit 401 outputs the voltage to be applied to the reactor 101 so that the output current $\overline{I}_{A1}$ of the inverter body 100 which is fed back by the current sensor 201 coincides with a signal $I_{A1}$ undergoing a coordinate conversion on the d-q axis by means of a three-phase/two-phase converting circuit 600 and a current command $\hat{I}_{A1}$ from the limiter circuit 402. Besides, the condenser 102 and the voltage caused by the second inverter device 21 are present on the output bus 3, and it is therefore required that the inverter body 100 generates a sum of the voltage of the output bus 3 and the voltage to be applied to the reactor 101 in order to apply a desired voltage to the reactor 101.

Hence, the adder 500 adds the voltage $\overline{V}_1$ of the condenser 102 which is detected by the voltage detector 300, the signal $\hat{V}_1$ which has undergone the coordinate-conversion on the d-q axis by the three-phase/two-phase converting circuit 601 and the output of the current control circuit 401. A signal thereof is coordinate-converted to assume three phases by means of a two-phase/three-phase converting circuit 604 and given as a voltage command to the PWM circuit 400.

The condenser reference current generation circuit 404 generates a reference current $\hat{I}_C^*$ which advances through 90° from a voltage command $\hat{V}_1^*$ of the condenser 102 as a current flowing to the condenser in accordance with a capacity of the condenser 102. The voltage command $\hat{V}_1^*$ of the condenser 102 is obtained from the output of the subtracter 504a, which will be mentioned later. Calculated by the subtracter 503 is a deviation between the voltage command $\hat{V}_1^*$ of the condenser 102 and the voltage $\hat{V}_1$ of the condenser 102. The voltage control circuit 403 inputting this deviation outputs a correction current signal to be outputted by the inverter body 100 in order to reduce the deviation.

The following are the steps of obtaining the output current command value $\hat{I}_{A1}^*$. The adder 502 calculates the outputs of the condenser reference current generating circuit 404 and of the voltage control circuit 403 and a signal $\hat{I}_{L1}^*$ obtained by the three-phase/two-phase converting circuit 602 effecting a coordinate-conversion, on the d-q axis, of the load current sharing command value $I_{L1}^*$ of the first inverter device 18 which is to be outputted by the current detection circuit 406a; and the results are limited by the limiter circuit 402. The output current command value $\hat{I}_{A1}^*$ of the inverter body 100 is thereby obtained. Hence, in a non-load state, the inverter body 100 supplies the current flowing to the condenser 102, whereby a non-load voltage is established. In this case, the voltage control circuit 403 corrects an underoutput and an overoutput of the condenser reference current generation circuit 404 which are caused due to an error in terms of current control and an error between a design value and an actual value of the capacity of the condenser 102.

Next, when the load 4 is applied, a command $I_{L1}^*$ is given from the current detection circuit 406a to the current minor loop to share $\tfrac{1}{2}$ of the load current $I_L$. It follows that each of the inverter devices 18, 28 shares $\tfrac{1}{2}$ of the load current. The limiter circuit 402 is herein intended to limit the command value to the current control circuit 401 down to an allowable current value or under of the inverter body 100 so that the inverter body 100 supplies no an overcurrent such as a rush current during the load actuation.

Based on the construction given above, the inverters 18, 28 are protected from the overcurrent by their current minor loops. Further the output voltage can be kept invariably in the sine wave by immediately following up a distortion and an abrupt change of the load current. A characteristic of this method is that the response is remarkably fast, because the above-mentioned control is performed in every switching of the high frequency PWM of each of the inverter devices. For instance, the control is effected per 100 sec when using a switching frequency of 10 kHz, and hence an excessive phenomenon to a disturbance such as the abrupt change of the load is completed in a time which is approximately 10 times as long as 100 sec. An excellent control performance can be obtained.

If the responses and accuracies in terms of voltage control of the first and second inverter devices 18, 28 are identical, the cross current cam be eliminated based on the construction of the control system described above. In practice a slight difference between the output voltages is caused by component variations a control gain and a main circuit constant. Also, the instantaneous voltage control is carried out, and hence a large proportion of the internal impedances of the inverter devices are occupied by the wire impedances. A large cross current can easily flow because of the slight difference between the output voltages. It is therefore difficult to perform the stable parallel operation with a small amount of cross current. For example, supposing that the voltage current sensors of the first and second inverter devices 18, 28 respectively have errors of $-0.5\%$, $+0.5\%$, an output voltage difference during the single operation is 1%. If it is assumed that a wire impedance between the first and second inverter devices 18, 28 is 1% or under, it follows that the cross current of 100% or above flows.

Constructed in this embodiment is a control circuit as if the impedance exists with respect to only the cross current flowing between the inverter devices, thereby restricting the cross current. The cross current restriction virtual impedance circuit 405a computes $\Delta \hat{I}_1 \times \hat{Z}_{im}$, where $\Delta \hat{I}_1$ is the cross current, and $\hat{Z}_{im}$ is the transfer function of the virtual impedance. The subtracter 504a subtracts this signal from the output $\hat{V}^*$ of the output reference voltage generating circuit 427. The result is set as a voltage command $\hat{V}_1^*$ of the condenser 102. The voltage of the condenser 102 instantaneously follows up the voltage command $\hat{V}_1^*$ owing to the above-mentioned voltage control system.

In accordance with this embodiment 9, as in the same way with the embodiment 1, the inverter device 18 has the output impedance of Zim with respect to only the cross current owing to the cross current restriction virtual impedance circuit 405a. The inverter device 18 operates as a voltage source of the low impedance with respect to the current components other than the cross current.

Figure 18:
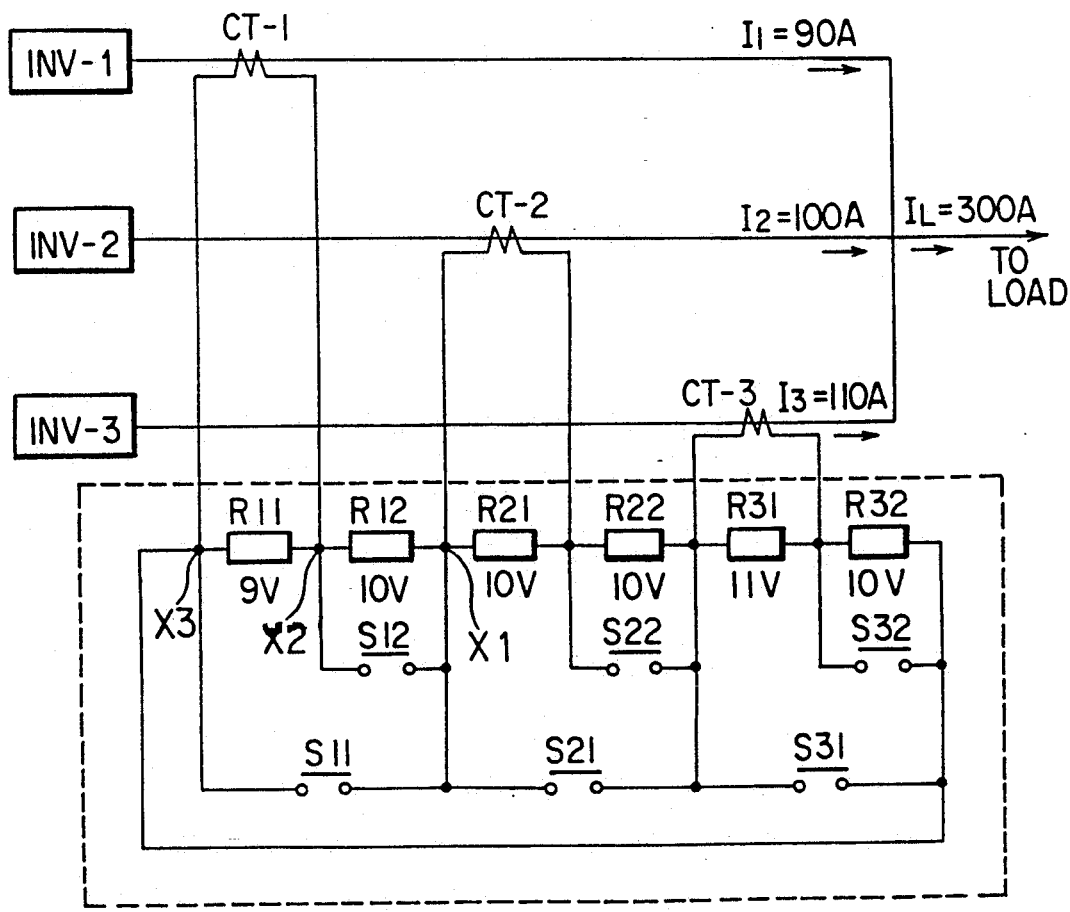
FIG. 18 a circuit diagram showing a concrete example of the current detection circuit.

FIG. 18 shows a concrete example of the current detection circuit for detecting the cross current and the current to be shared by the inverter device. This circuit is an already known means. The operation thereof is, however, briefly explained. For example, it is assumed that three inverter devices, INV-1, INV-2, INV-3 respectively output the load currents $I_L$ of 300A, wherein $I_1=90A$, $I_2=100A$, and $I_3=110A$. The output currents of the respective inverter devices INV-1 through INV-3 are measured by current sensors CT-1 through CT-3. Load resistors R11, R21, R31 each having the same resistance value are connected to the individual current sensors CT-1 through CT-3, thereby obtaining, e.g., 9 V, 10 V, 11 V, respectively. These voltages correspond to the output current of the inverter devices. Connected, as illustrated in the Figure, are resistors R12, R22, R32 each having the same sufficiently large resistance value are, as shown in the Figure, connected to R11, etc., with the result that a voltage given by $\frac{1}{3}$ $(9+10+11)=10$ V is obtained in each of these resistors. This voltage is $\frac{1}{3}$ as small as the load current $I_L$, i.e., corresponds to a value of the current to be shared by each inverter.

Hence, the current to be shared is obtained between points X1, X2, and a voltage corresponding to the cross current is also obtained between points X1, X3 with respect to the inverter device INV-1. These signals may be therefore transmitted to the control circuit in insulation. Further, when stopping the inverter device INV-1, a switch S12 is at first turned ON. Voltages of the resistors R22, R32 are respectively set to 15 V. All the loads are shifted to other two inverter devices INV-2, INV-3. Next, simultaneously when turning ON a switch S11, the inverter device INV-1 may be stopped.

For simplifying the explanation of the concrete example of the current detection circuit, it is ignored that the current and voltage are vector quantities. The same relation is, however, established even in the case of the vector quantities.

Figure 19:
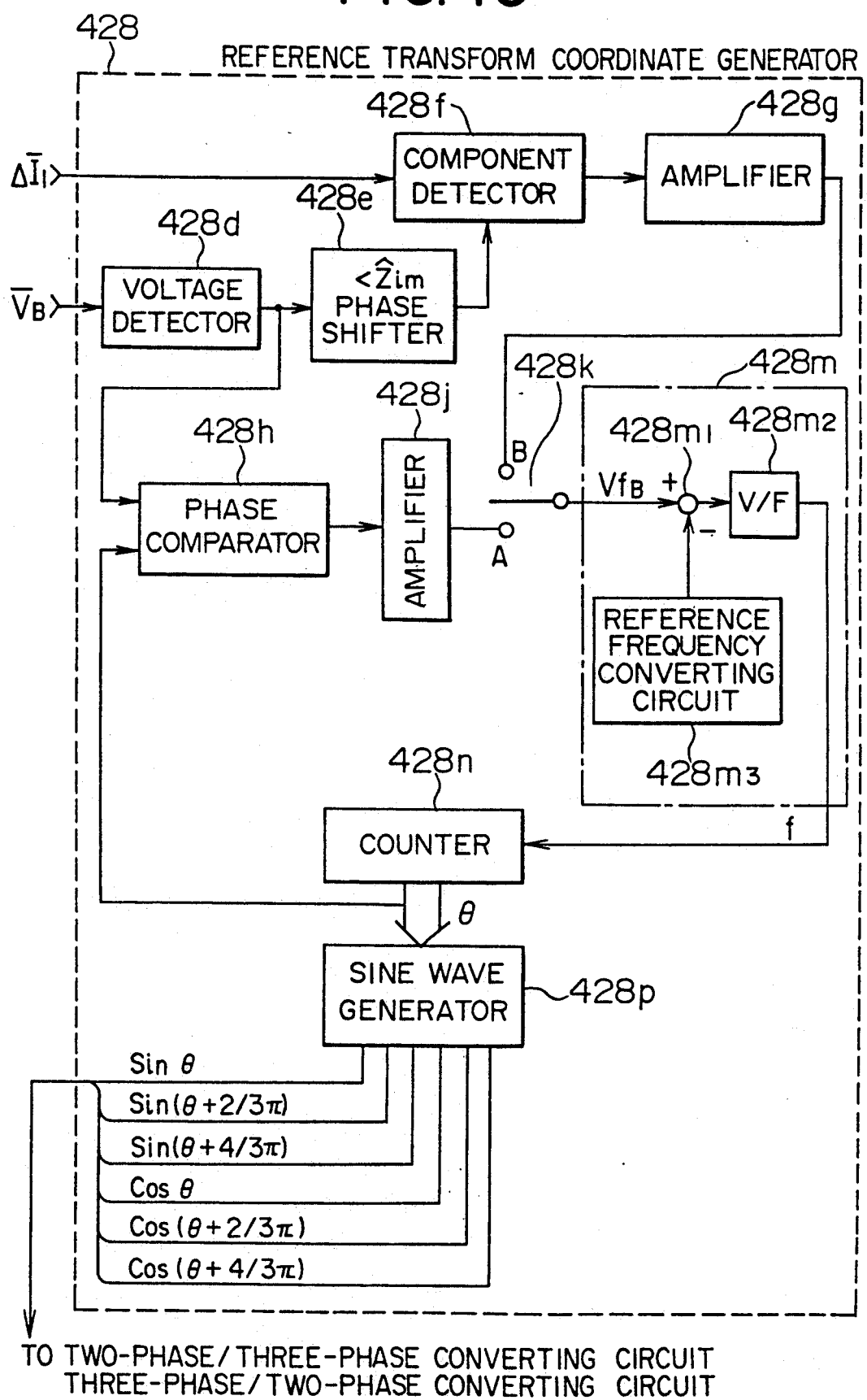
FIG. 19 is a block diagram illustrating a reference transform coordinate generator employed in the embodiment 9.

The instantaneous voltage control system and the cross current restriction control which have been described so far are configured on the d-q axis. The reference transform coordinate generator 428 generates six pieces of important three-phase sine wave signals for the reference transform coordinates indispensable for the control on the d-q axis (formulae (3), (31)). FIG. 19 is a block diagram illustrating a construction of the reference transform coordinate generator 428. The construction and operation thereof will be explained with reference to the Figure.

Referring to FIG. 19, the symbol 428d designates a voltage detector for detecting a bus voltage $V_B$; 428h a phase comparator; 428j an amplifier; 428m a voltage frequency converting circuit; and 428n a counter. These components are combined to form a phase synchronous control loop. Indicated at 428k is a switch which operates on the side A when the output switch 103 is kept OFF but on the side B when being kept ON. A sine wave generator 428p generates six pieces of three-phase sine wave signals serving as a reference for the coordinate transform in accordance with a count value of the counter 428n. A phase shifter 428e creates a virtual vector which is more delayed by an angle $\angle \hat{Z}_{im}$ of the virtual impedance than the bus voltage. A component detector 428f detects a component vertical to this virtual vector of the cross current $\Delta \hat{I}_1$. The symbol 428g represents an amplifier.

The voltage frequency converting circuit 428m consists of an adder 428m1, a voltage frequency converter 428m2 and a reference frequency generator 428m3. A frequency f is adjusted on the order of several % by an input $Vf_B$.

Therefore, when the output switch 103a is turned OFF, the bus voltage and the count value of the counter 428n are synchronized by the phase synchronous control loop (428h, 428j, 428m, 428n). The sine wave generator 428p generates six pieces of three-phase sine wave signals synchronizing with the bus voltage.

Further, when the output switch 103a is turned ON, a switch 428k is switched on the side B. Inputted via the amplifier 428g to the voltage frequency converting circuit 428m is a frequency component of the output voltage, vertical to the virtual vector which is more delayed by the angle of the virtual impedance than the bus voltage, of the output current which is outputted by the component detector 428f, i.e., a component attributed to the phase difference of the cross current. This component is added to the reference frequency 428m3, thereby infinitesimally adjusting the phase of the reference sine wave signal used for the coordinate transform by infinitesimally adjusting the frequency. This reference sine wave signal synchronizes with the output voltage, and hence it follows that the infinitesimal adjustment of the reference sine wave signal is equivalent to the infinitesimal phase adjustment of the output voltage.

The output current is composed of the cross current and the load current to be shared. This implies that the frequency component of the output current is a sum of the frequency component ($\frac{1}{2} I_{LY}$) of the load current to be shared and the components ($\Delta I_{1Y}, \Delta I_{2Y}$) attributed to the phase difference of the cross current. The output voltage phase of the first inverter device 18 is advanced or delayed in accordance with $\frac{1}{2} I_{LY} + \Delta I_{1Y}$, while the output voltage phase of the second inverter device 28 is advanced or delayed in accordance with $\frac{1}{2} I_{LY} + \Delta I_{2Y}$. Herein, $\Delta I_{1Y} = -\Delta I_{2Y}$, and hence the output voltage phase of the first inverter device 18 is advanced or delayed in accordance with a polarity and a magnitude of $2 \times \Delta I_{1Y}$ relatively to the second inverter device 28.

Therefore, the inverter body 100 generates the equiphase output voltage to the bus voltage before a parallel entrance (output switch 103a is turned OFF) and, after the parallel entrance (output switch 103a is turned ON), infinitesimally adjusts the output voltage phase so that the component derived from the phase difference of the cross current becomes zero.

Figure 20:
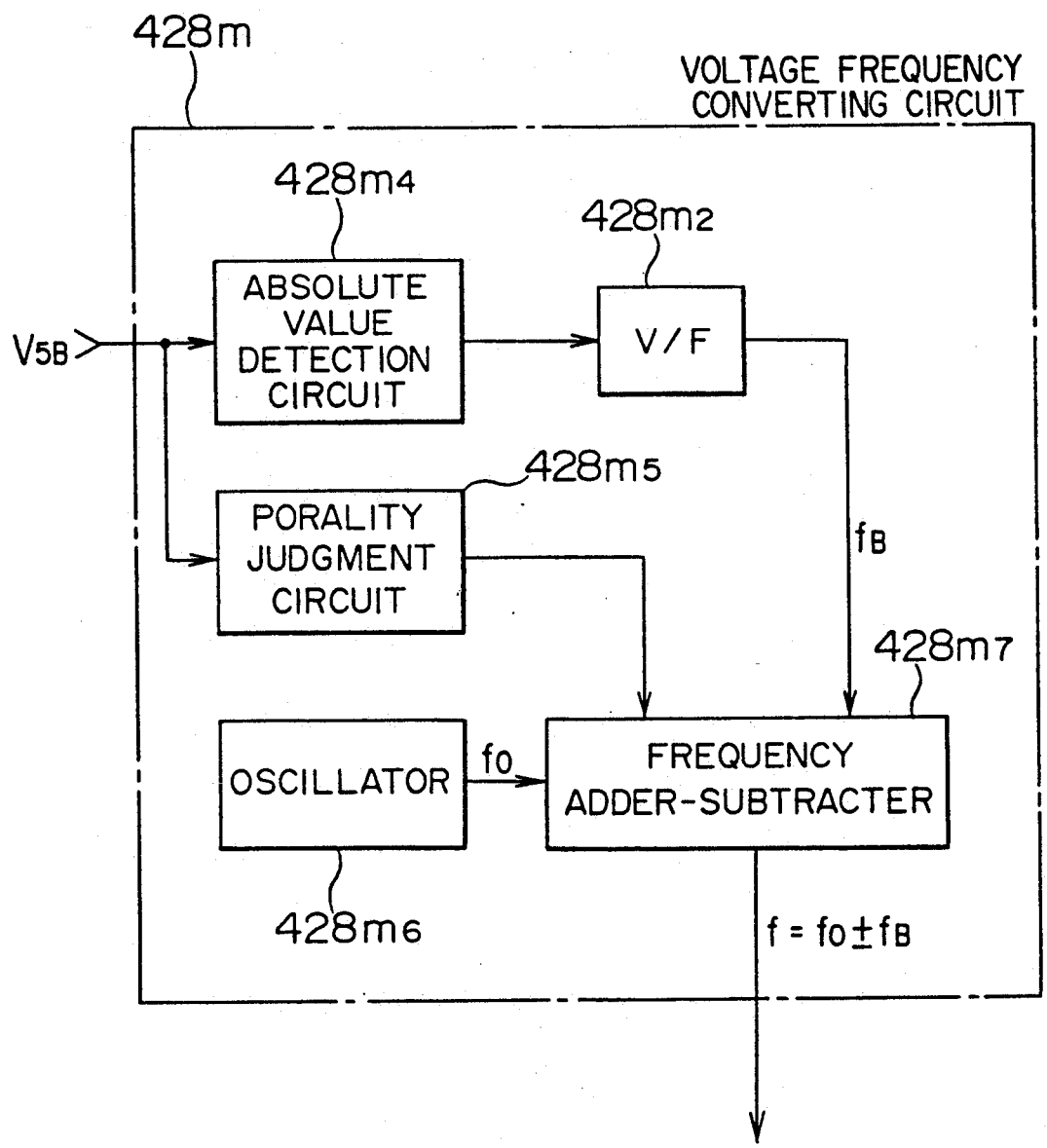
FIG. 20 is a block diagram depicting a voltage frequency converting circuit of FIG. 19.

Note that the voltage frequency converting circuit 428m may be constructed as shown in FIG. 20. More specifically, the polarities (negative and positive) and the absolute value of the input $Vf_B$ are detected by 428mA, 428m5. A frequency $f_B$ corresponding to the absolute value thereof is obtained by the voltage frequency converter 428m2 and added to or subtracted from the frequency $f_0$ of the oscillator 428m6 in a frequency adder-subtracter 428m7. A characteristic of this circuitry is that the frequency accuracy of the output voltage can be easily enhanced by use of a high accuracy oscillator.

Figure 21:
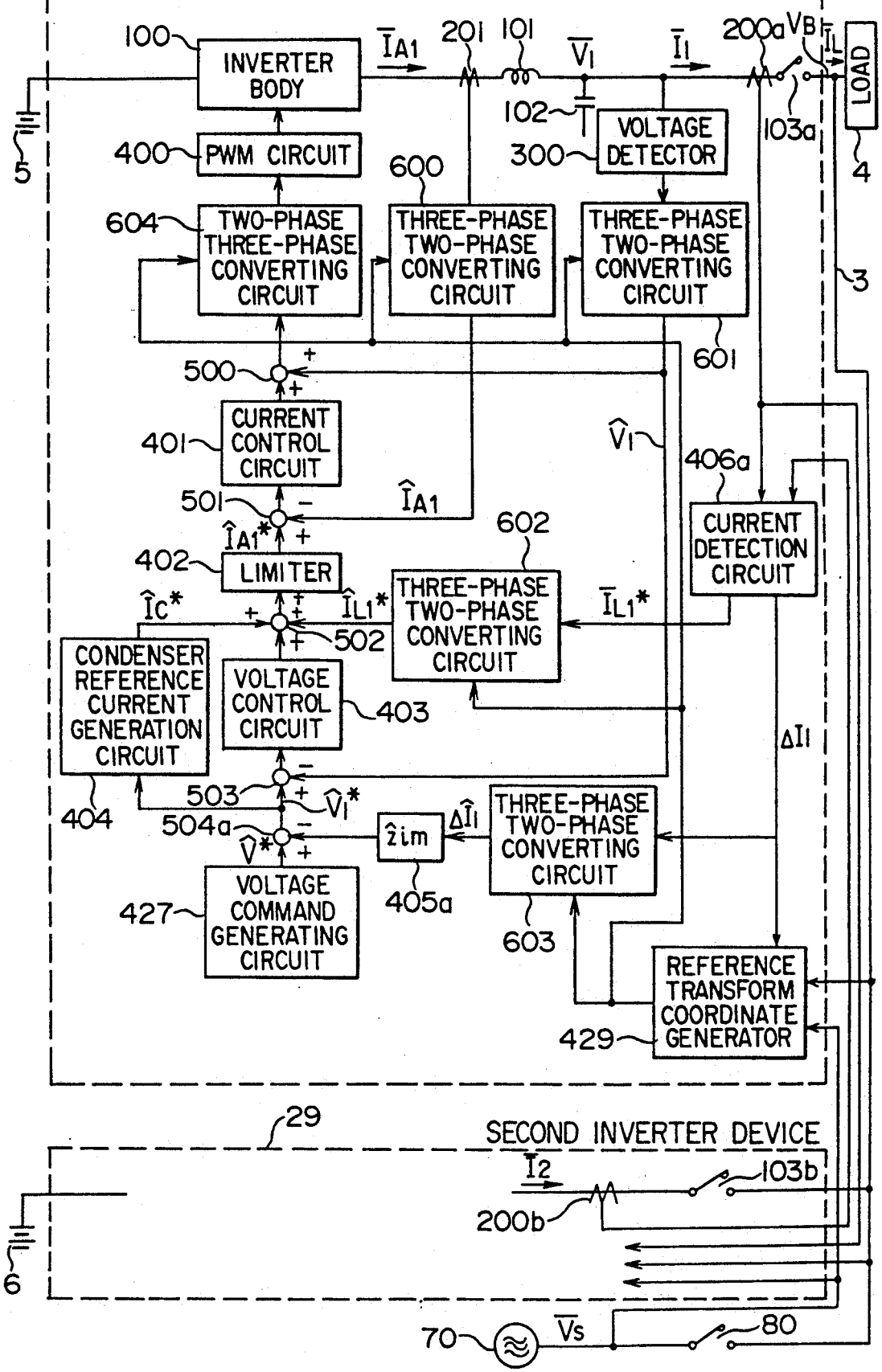
FIG. 21 is a block diagram showing an embodiment 10.

Embodiment 10:

Next, FIG. 21 demonstrates an embodiment 10. Still another power supply 70 is connected via a switch 80 to the output bus 3 in the embodiment 9. First and second inverter devices 19, 29 are constructed to operate in equiphase to the power supply 70. If the first inverter device 19 or the second inverter device 29 is broken down, or during an inspection, the output switches 103a, 103b are turned OFF, whereas a switch 80 is turned ON. The power supply 70 supplies the electricity to the load 4 without any instantaneous interruption. The system is thus constructed. A difference from the inverter devices in the embodiment 9 lies in a construction of a reference transform coordinate generator 429.

Figure 22:
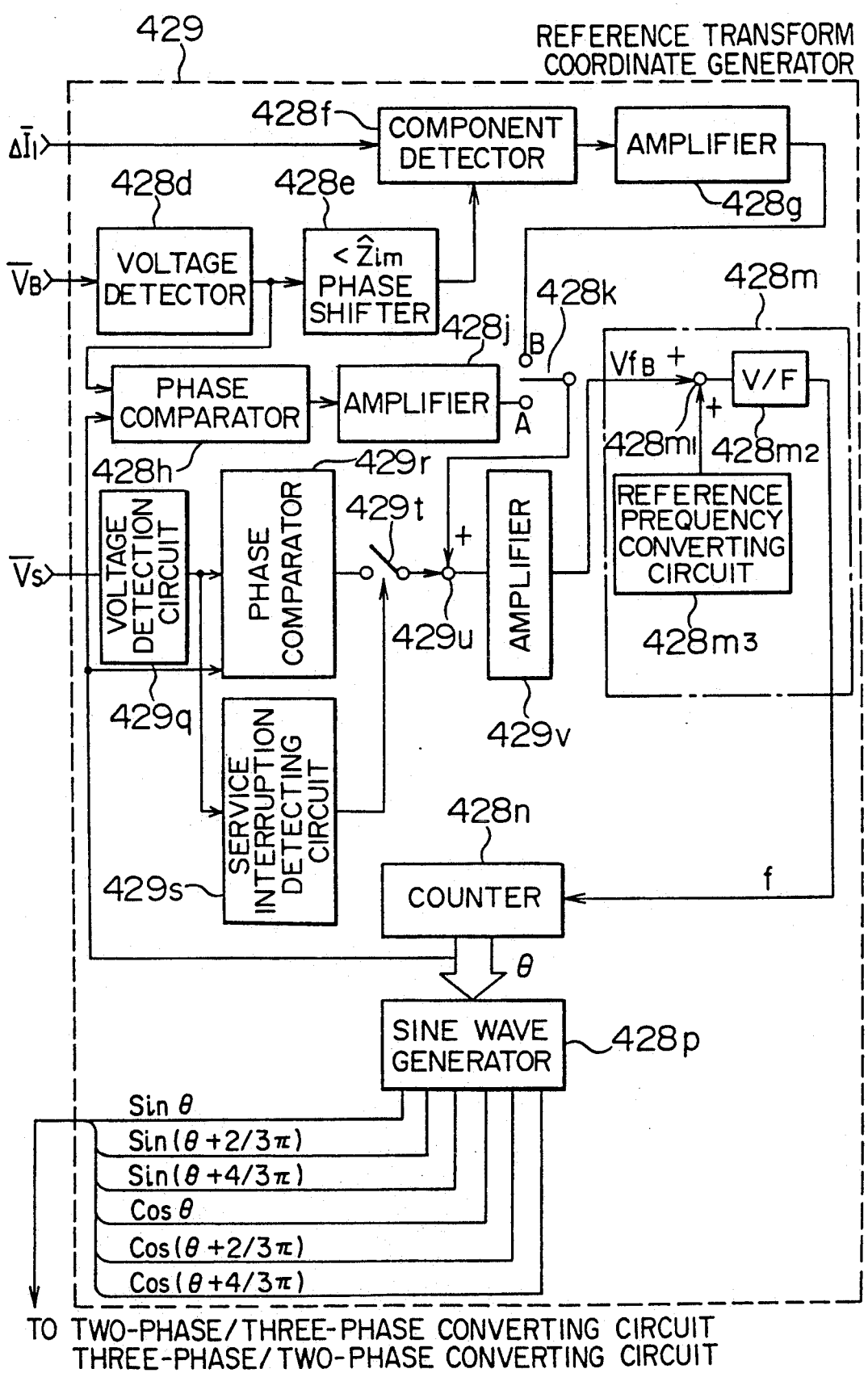
FIG. 22 is a block diagram illustrating the reference transform coordinate generator used in the embodiment 10.

FIG. 22 is a block diagram depicting the reference transform coordinate generator 429. This reference transform coordinate generator 429 is constructed by adding, to the reference transform coordinate generator 428 shown in the embodiment 9, a voltage detector 429q, a phase comparator 429r, a service-interruption detecting circuit 429s, switches 429t, an adder 429u and an amplifier 429v.

A voltage $\hat{V}_s$ of the power supply 70 is herein detected by the voltage detector 429q. The service-interruption detecting circuit 429s turns ON the switch 429t in a normal state of the power supply 70 and turns it OFF during a service to interruption. Hence, in the normal state of the power supply 70, the output bus voltage assumes an equiphase to the power supply 70 because of a phase synchronous control loop consisting of the phase comparator 429r, the amplifier 429v, the voltage frequency converting circuit 428m and the counter 428n. A signal from the switch 428k is added to an output of a phase comparator 429r by means of an adder 429u and is imparted as an auxiliary signal to the phase synchronous control loop. As in the same manner with the embodiment 9, before the parallel entrance, the output assuming the equiphase to the bus voltage is generated. After the parallel entrance, the phase of the output voltage is infinitesimally adjusted so that the component attributed to the phase difference of the cross current becomes zero.

Figure 23:
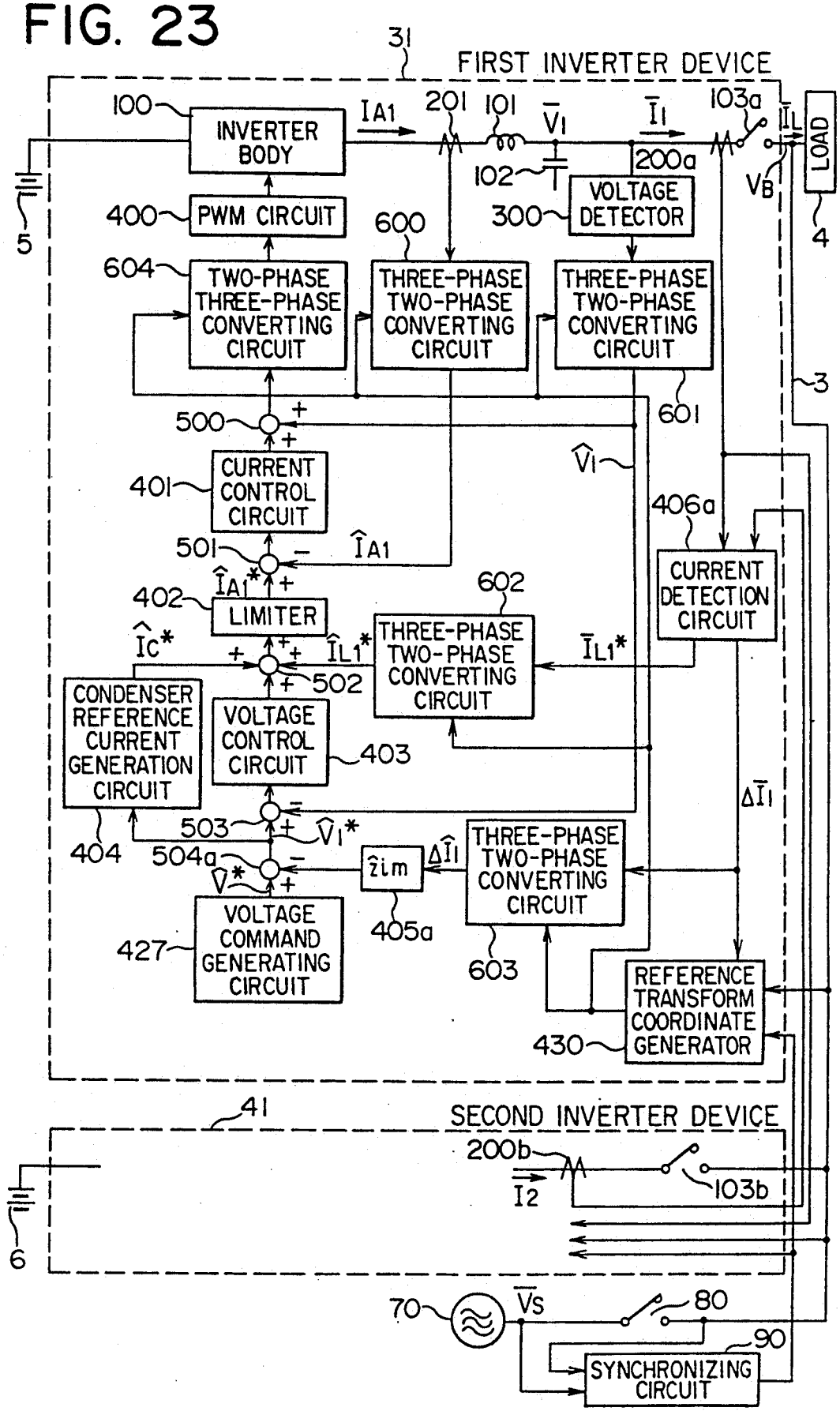
FIG. 23 is a block diagram showing an embodiment 11.

Embodiment 11:

FIG. 23 demonstrates an embodiment 11, wherein there is further provided a synchronizing circuit 90 for operating a first inverter device 31 and a second inverter device 41 in the equiphase to the power supply 70.

Figure 24:
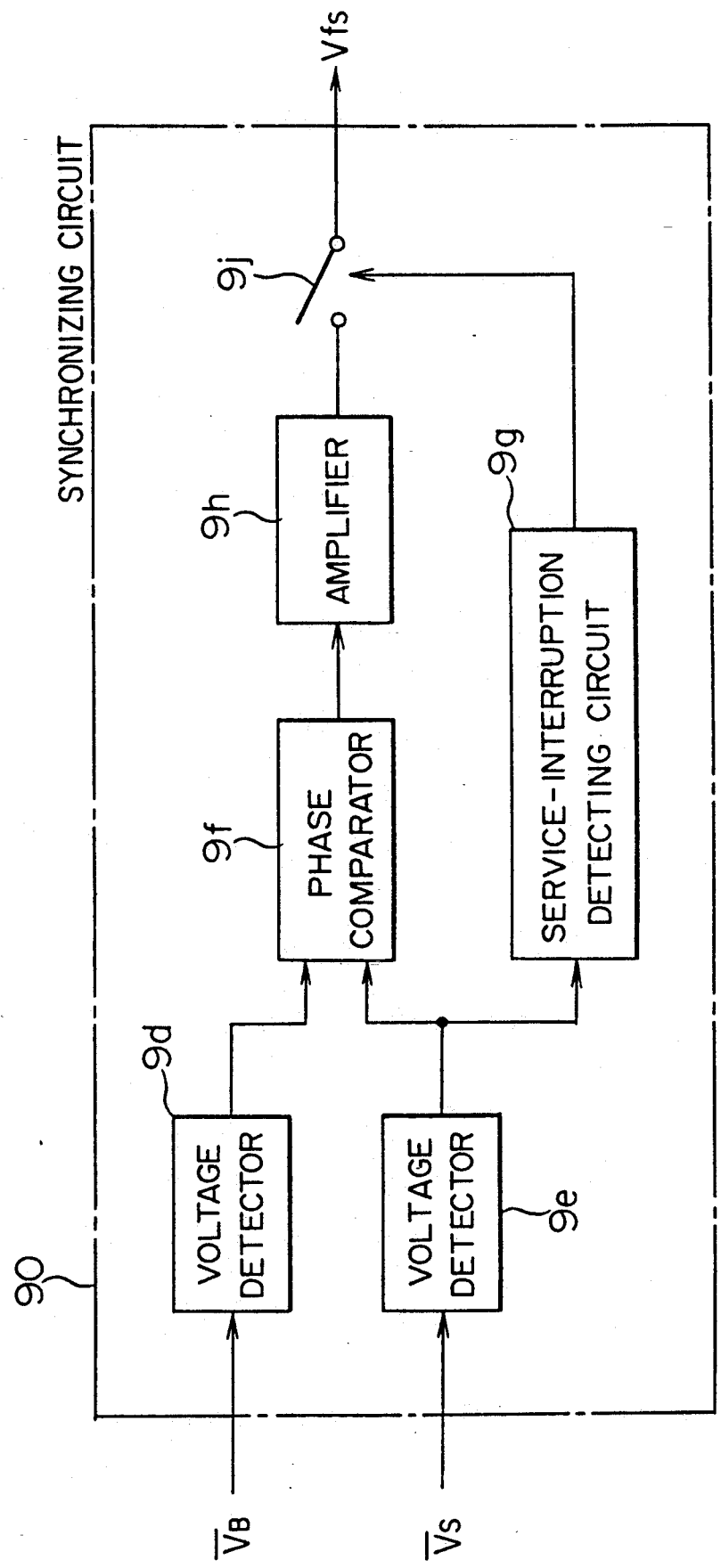
FIG. 24 is a block diagram illustrating a synchronizing circuit employed in the embodiment 11.

FIG. 24 is a block diagram illustrating a construction of the synchronizing circuit 90. Voltage detectors 9d, 9e detect an output bus voltage $\hat{V}_B$ and a voltage $\hat{V}_s$ of the power supply 70, respectively. A phase comparator 9f obtains a phase difference therebetween. Signals $V_{fs}$ amplified by an amplifier 9h are imparted to a first inverter device 41 and a second inverter device 41 through a switch 9j. A service-interruption circuit 9g turns ON the switch 9j in the normal state of the power supply 70 but turns OFF if when the service interruption is caused.

Figure 25:
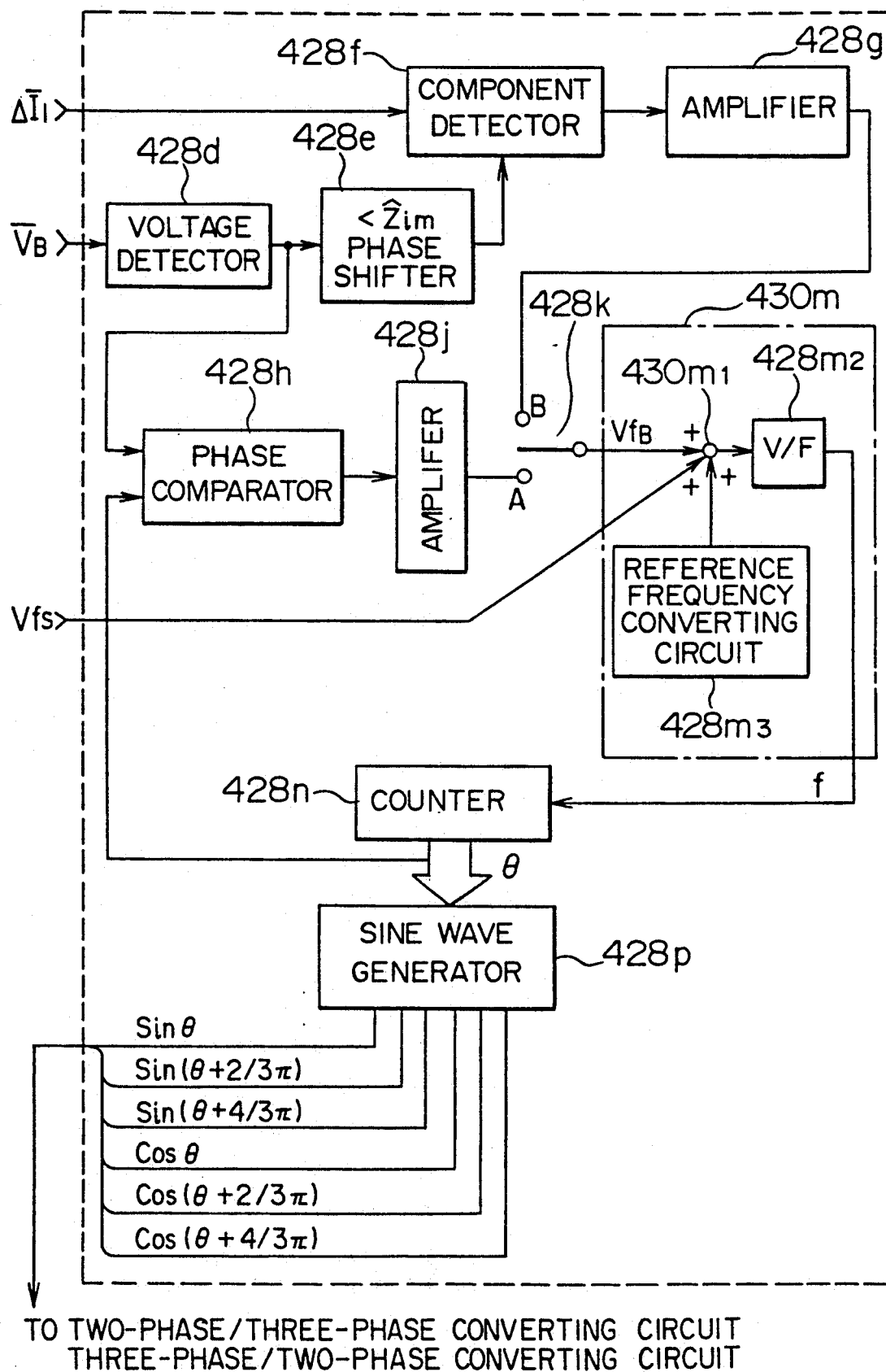
FIG. 25 is a block diagram illustrating the reference transform coordinate generator used in the embodiment 11.

A difference from the inverter devices in the embodiment 10 lies in a construction of a reference transform coordinate generator 430. FIG. 25 is a block diagram illustrating a construction of the reference transform coordinate generator 430. The generator 430 has the same construction as that of the reference transform coordinate generator 428 shown in the embodiment 9 other than an arrangement that an adder 430m1 of a voltage frequency converting circuit 430m has three inputs. The output $V_{fs}$ of the above-mentioned synchronizing circuit 90 is inputted to the voltage frequency converting circuit 430m, and the same operations as those of the embodiment 10 can be therefore expected.

Figure 26:
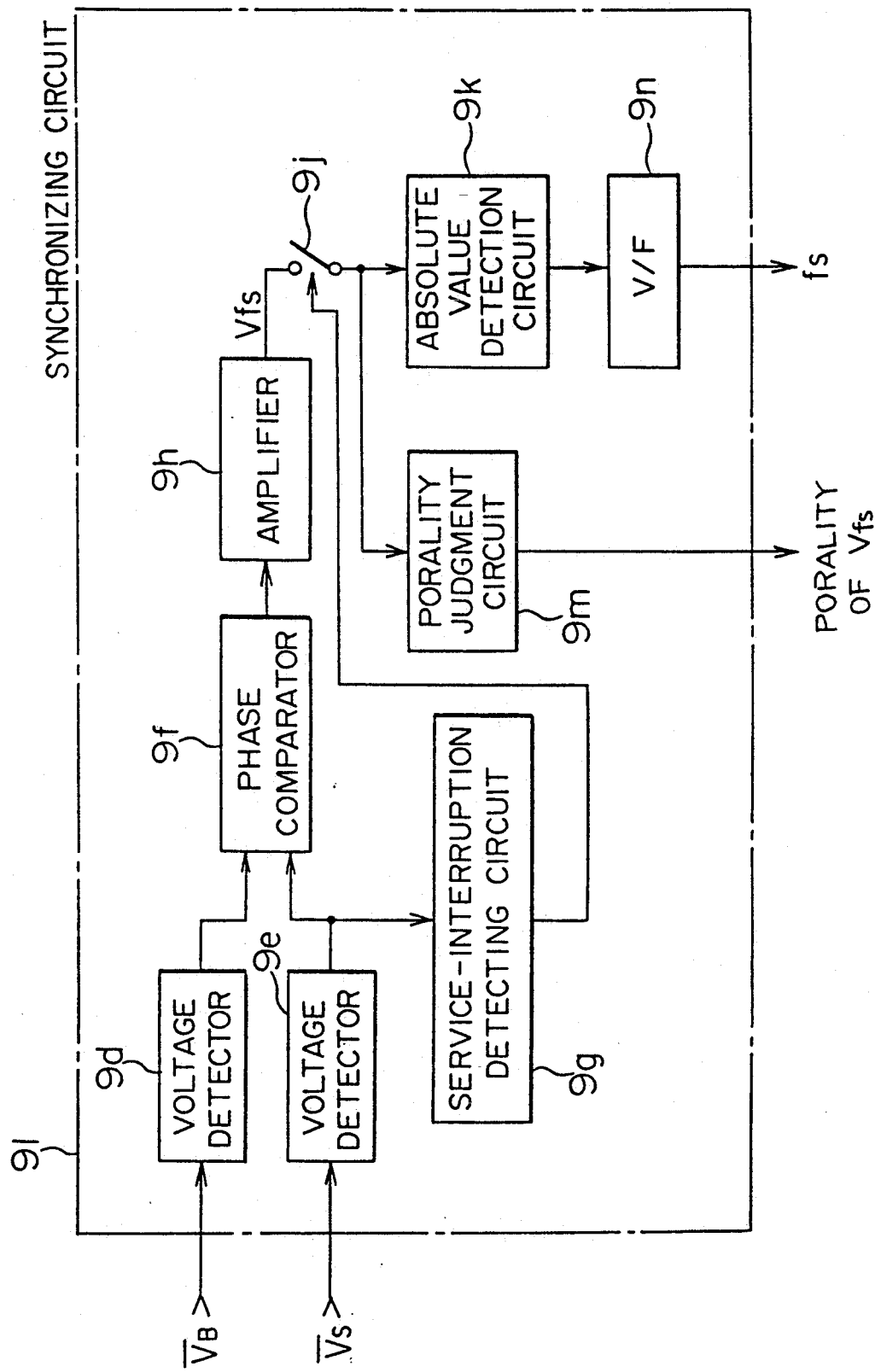
FIG. 26 is a block diagram illustrating another synchronizing circuit.
Figure 27:
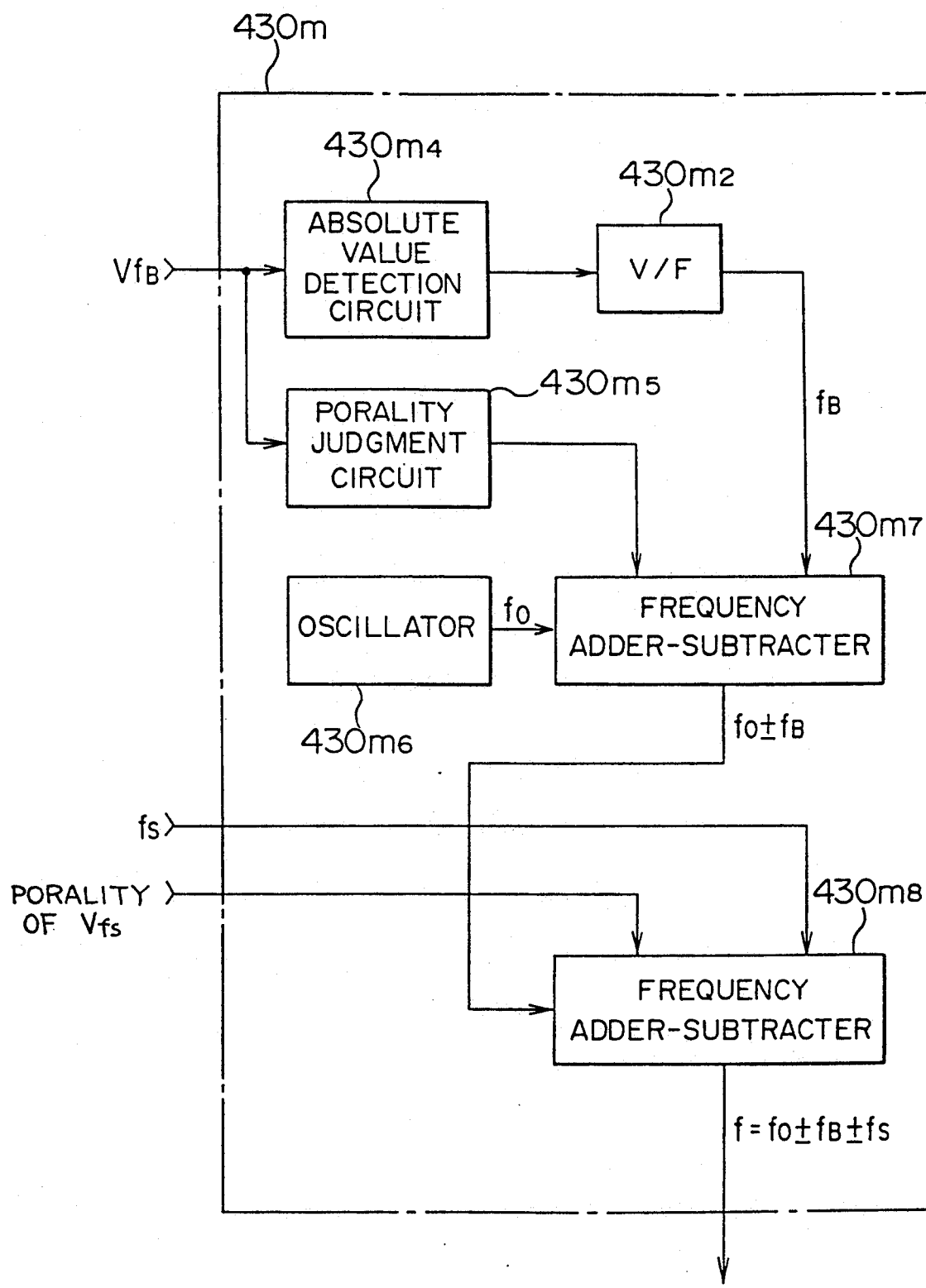
FIG. 27 is a block diagram depicting another voltage frequency converting circuit.

The output $V_{fs}$ is transferred and received in the form of an analog signal between the synchronizing circuit 90 and the reference transform coordinate generator 430 which are illustrated in FIGS. 24 and 25. As explained in FIG. 20, however, the voltage frequency converting circuit 430m in the reference transform coordinate generator 430 may be, as shown in FIG. 27, constructed in combination with a synchronizing circuit 91 shown in FIG. 26 by using a polarity signal and a frequency corresponding to the absolute value of $V_{fs}$.

Figure 28:
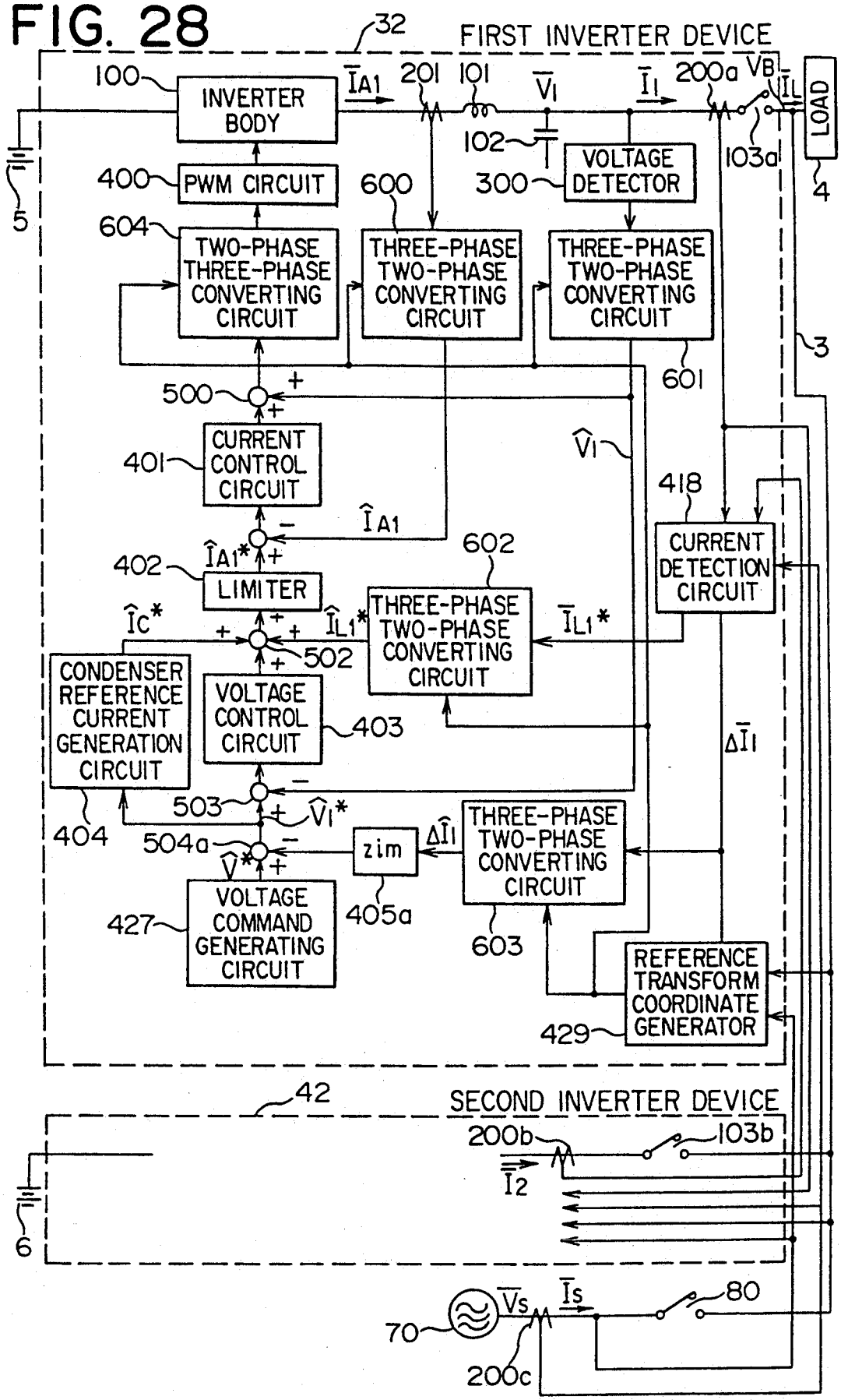
FIG. 28 is a block diagram showing an embodiment 12.

Embodiment 12:

Next, FIG. 28 illustrates an embodiment 12. The current detection circuit in the embodiment 10 is replaced with a current detection circuit 418 for obtaining the following by use of the current $\bar{I}_s$ of the power supply 70 which is detected by the current detector 200c:

$$\bar{I}_{L1}^* = \tfrac{1}{3}(\bar{I}_1 + \bar{I}_2 + \bar{I}_s) \tag{40}$$

$$\Delta \bar{I}_1 = \bar{I}_1 - \bar{I}_{L1}^* \tag{41}$$

With such a construction, a first inverter device 32 and a second inverter device 42 are capable of instantaneously restricting the cross current flowing between the power supply 70 and the devices themselves. Therefore, the switch 80 is constantly kept ON, and the parallel operation with respect to the load 4 can be performed.

Figure 29:
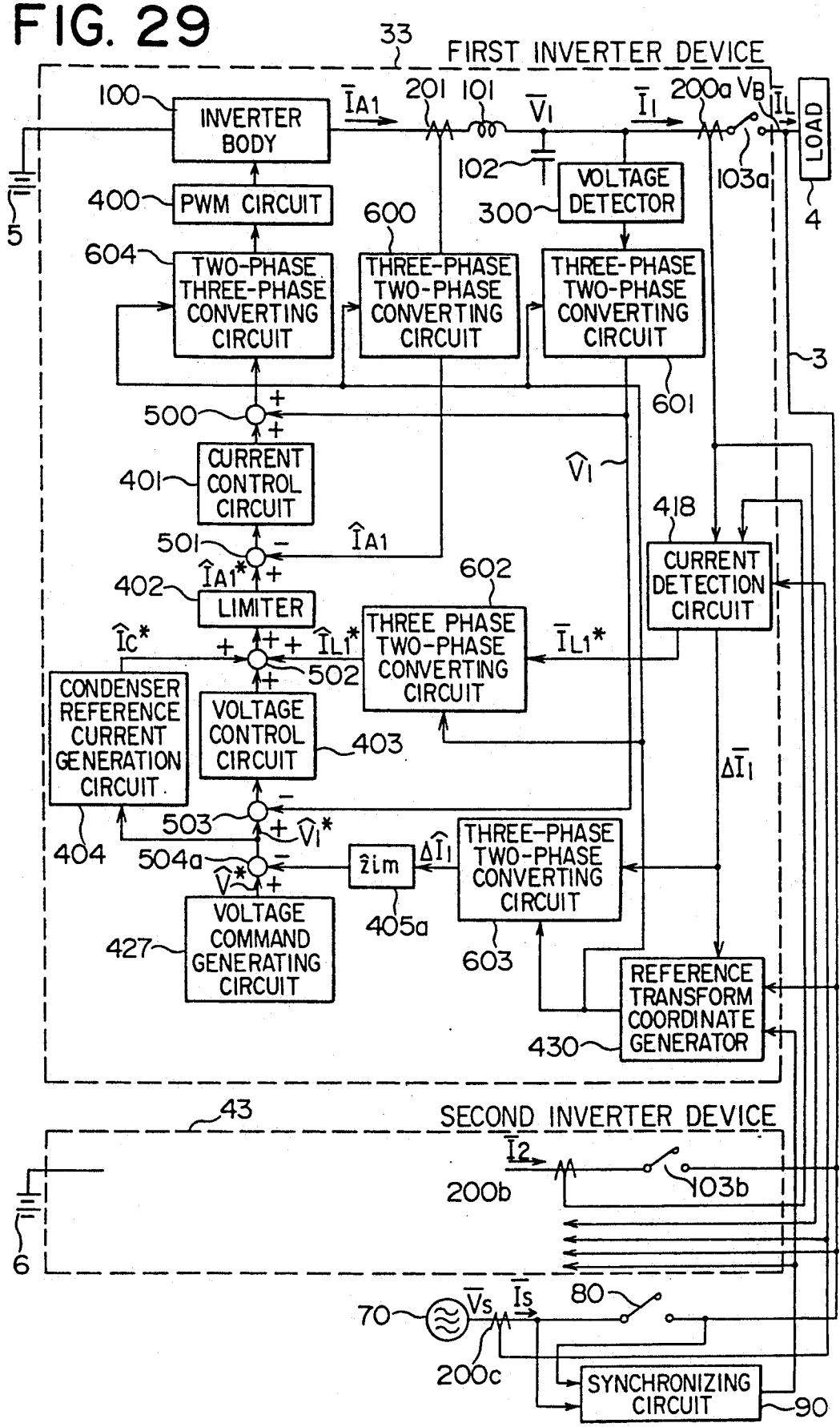
FIG. 29 is a block diagram showing an embodiment 13.

Embodiment 13:

FIG. 29 demonstrates an embodiment 13. The current detection circuit in the embodiment 11 is replaced with the current detection circuit 418 employed in the foregoing embodiment 12. With such a construction, a first inverter device 33 and a second inverter device 43 are, as in the same way with the embodiment 12, capable of restricting the cross current flowing between the power supply 70 and the devices themselves.

In the respective embodiments discussed above, the value of the current flowing to the parallel condenser 102 of the inverter output filter is given to the command value of the current minor loop, thereby enhancing the controllability. The condenser reference current generating circuit 404 may be omitted. This is because the voltage control circuit 403 operates so that the output voltage of the first inverter device 11 or the like coincides with the reference output voltage $V_1^*$ or $\hat{V}_1^*$, as a result of which the signal substituting for the condenser reference current signal is generated, and circuit 403 operates as the sine wave inverter control system without causing an obstacle. In this case, the deviation is reduced in the voltage control when the amplifying rate of the voltage control circuit 403 is sufficiently large.

Further, the description given above has dealt with the case where the control circuit is constructed as an instantaneous voltage control system having the current minor loop. It is possible to stably operate the AC output inverter in parallel by means of the cross current restriction virtual impedance circuit so long as the voltage control system is capable of controlling the output voltage at a high speed even when having no current minor loop.

Figure 30:
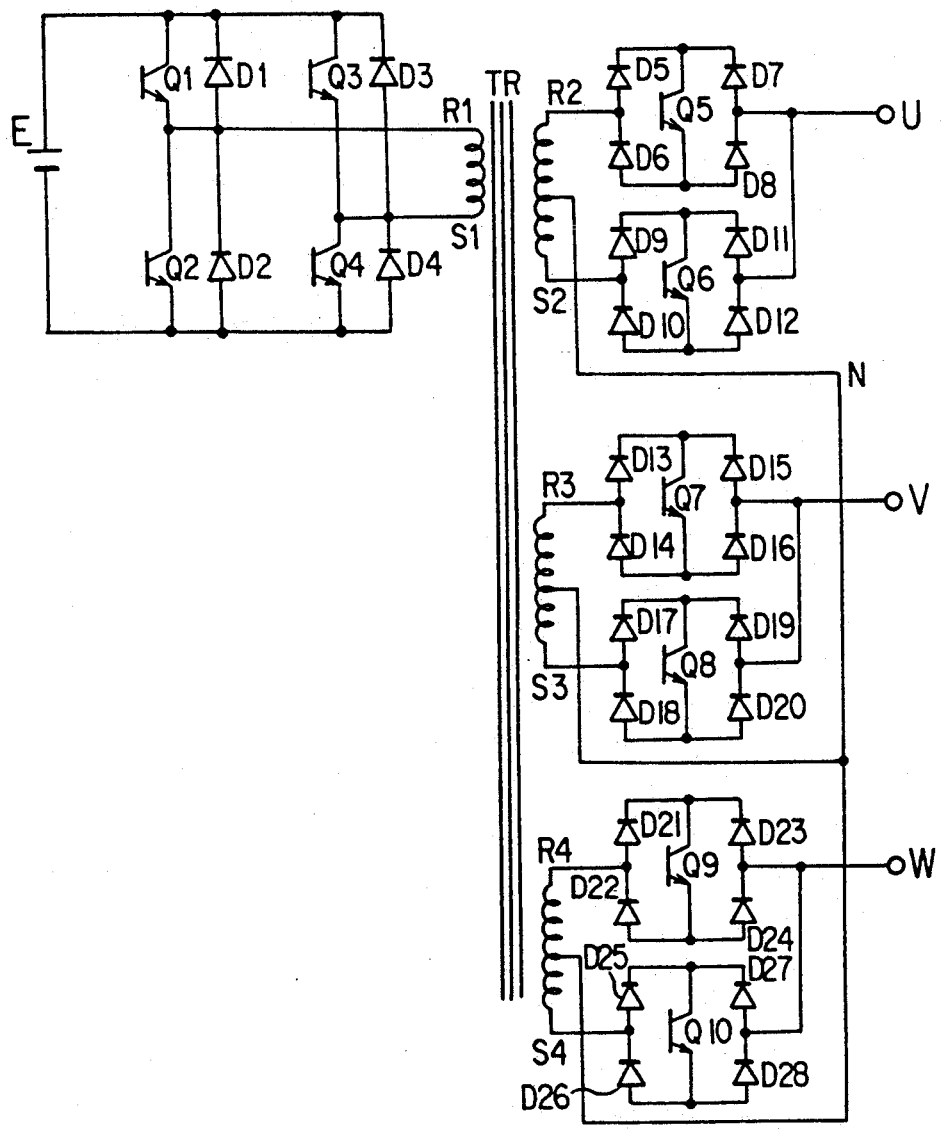
FIG. 30 is a circuit diagram illustrating other inverters used in the present invention.
Figure 31:
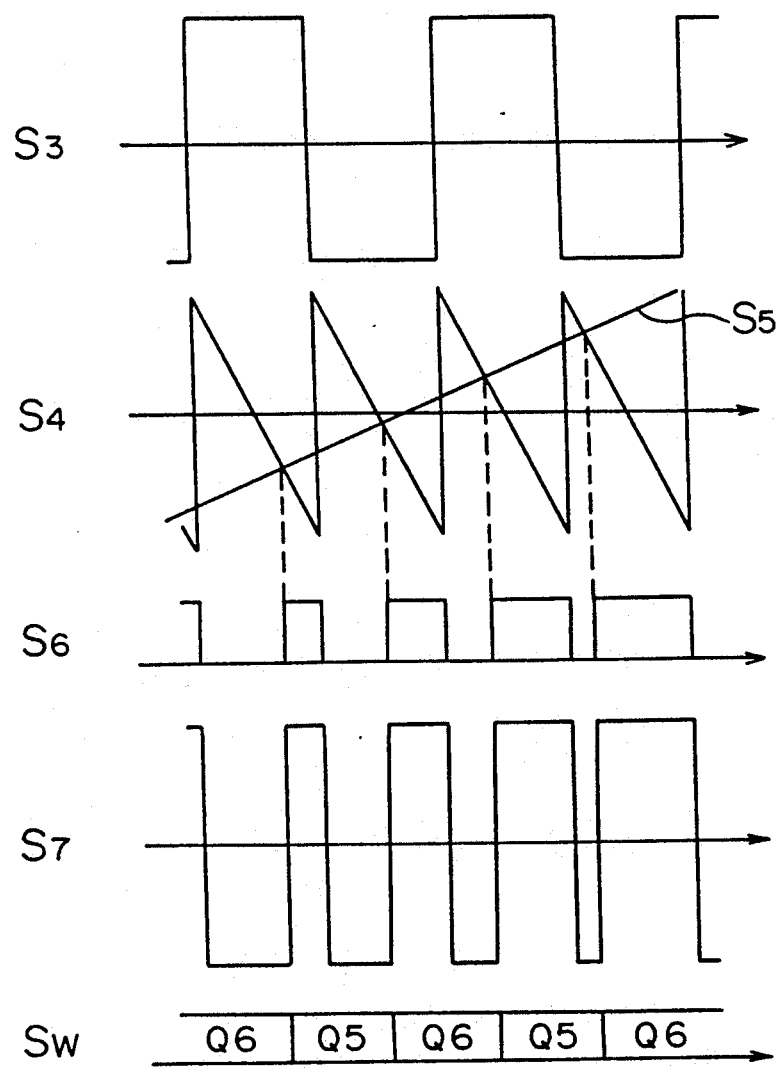
FIG. 31 is a timing chart showing the operation of the inverters of FIG. 30.
Figure 32:
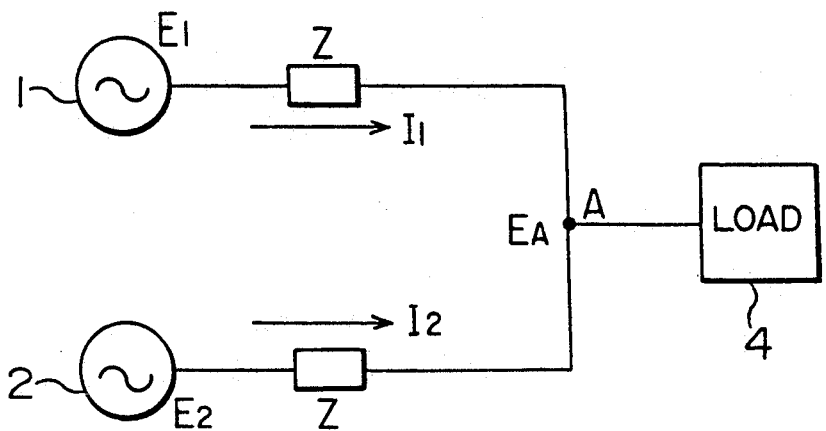
FIG. 32 is an equivalent circuit diagram during the parallel operation of the AC output inverters based on the conventional system.
Figure 33:
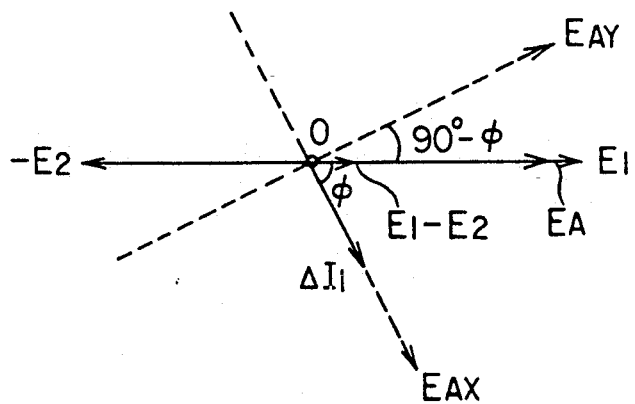
FIGS. 33 and 34 are vector diagrams during the parallel operation of the AC output inverters based on the conventional system.
Figure 34:
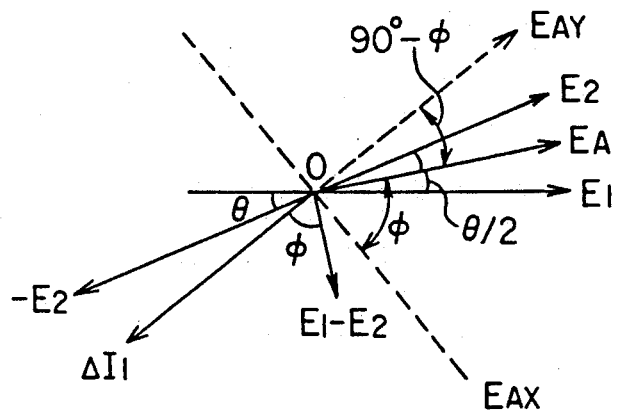
Figure 35:
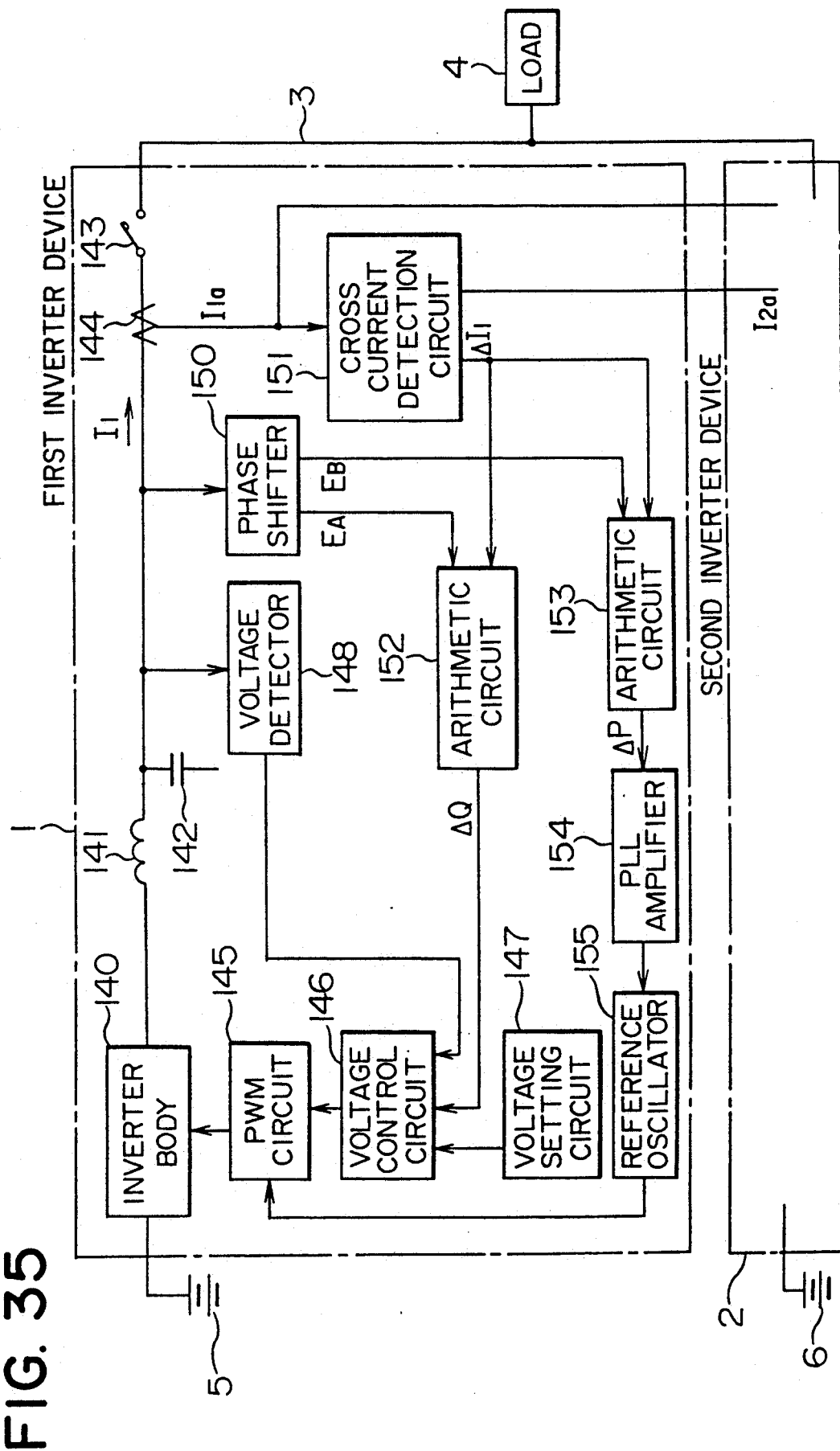
FIG. 35 is a block diagram showing a construction of the conventional parallel operation system.

The embodiments 9–13 have dealt with the parallel operation of the three-phase inverters. The same principle is applicable to, for example, as illustrated in FIG. 30, a inverter capable of the instantaneous voltage control such as a high frequency link type inverter for converting the direct current into a high frequency rectangular wave and further a low frequency sine wave by combining an high frequency inverter with a cycloconverter.

In the inverter depicted in FIG. 14, a rectangular wave $S_3$ shown in FIG. 15 is obtained on the secondary side of a transformer TR by switching from a transistor Q1 to a transistor Q4. Formed next are sawtooth waves $S_4$ synchronizing with switching of the inverter. Obtained also are signals $S_6$ which are turned ON/OFF at cross points of the sawtooth waves and the output voltage command signals $S_5$. One of U-phase switches Q5, Q6 of the cycloconverter is selected based on a polarity of a voltage RS of the inverter as well as on the signal $S_6$. A voltage signal $S_7$ corresponding to the signal $S_5$ is obtainable between U and N in FIG. 30. Similarly, the control between N and V and between N and W is also effected, thereby obtaining three-phase outputs.

The principle shown in the respective embodiments can be actualized by a discrete circuit using an analog arithmetic amplifier or the like. The principle can be also, however, actualized by software processing under the digital control which employs a microprocessor or a digital signal processor.

For simplicity, in the description given above, there have been exemplified two sets of inverter devices having the same capacity. The invention is, however, applicable to the parallel operation of n-sets of inverters having different capacities. In this case, CT-2, CT-3, etc. and the resistors R11, R21, R31, etc. are changed in accordance with the capacities, whereby the same voltage is obtained at the terminals of R11, R21, R31, etc. on the occasion of the rated current. Thus, all the inverters share the load in proportion to the capacities.

Although the illustrative embodiments have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A parallel operation system comprising:
   a plurality of three-phase AC output inverters each including a reference sine wave generating circuit for controlling an instantaneous value of output voltages by causing arms of the plurality of three-phase AC output inverters to effect switching in respective phases a plurality of times during one cycle, including the use of two components of synchronous rotational coordinates and for generating a sine wave signal serving as a reference for a coordinate transform;
   an additional power supply system;
   a bus for sharing a load current between respective inverters of the plurality of three-phase AC output inverters and said additional power supply system by connecting outputs of said respective inverters and said additional three-phase AC power supply to a load;
   a detection circuit for detecting a cross current component of an electric current flowing between said respective inverters and said additional three-phase AC power supply; and
   a control circuit for controlling the output voltages of said respective inverters to restrain the cross current component detected by said detection circuit and adjusting a phase of the sine wave signal generated from a reference sine wave generating circuit within each of said inverters.

2. The system as set forth in claim 1, wherein said control circuit adjusts a phase of the sine wave signal on the basis of a component attributed to a phase difference in the output voltages between said inverters and said additional three-phase AC power supply in the cross current component detected by said detection circuit.

3. The system as set forth in claim 1, wherein said control circuit adjusts a phase of the sine wave signal on the basis of a component vertical to a virtual vector which is delayed by an output impedance of said respective inverters with respect to a bus voltage of the load current.

4. A parallel operation system comprising:
   a plurality of AC output inverters for controlling instantaneous values of output voltages by causing respective arms of each of the AC output inverters to effect switching in respective phases a plurality of times during one cycle;
   a bus for connecting outputs of said plurality of AC output inverters to a load so that a load current is shared by said plurality of AC output inverters;
   a synchronous circuit for synchronizing said plurality of AC output inverters by outputting common synchronous signals to said plurality of AC output inverters;
   a detection circuit for detecting a cross current component of an electric current flowing between mutual inverters of said plurality of AC output inverters; and a control circuit for respectively controlling each of the output voltages of said plurality of AC output inverters to restrain the cross current component detected by said detection circuit, said control circuit controlling phases of the output voltages of said respective AC output inverters on the basis of a component attributed to a phase difference in the output voltage between said mutual inverters in the cross current component detected by said detection circuit.

5. A parallel operation system comprising:

at least a single AC output inverter for controlling an instantaneous value of an output voltage by causing respective arms of the at least a single AC output inverter to effect switching in respective phases a plurality of times during one cycle;

other power supply system;

a bus for sharing a load current to said at least one AC output inverter and said other power supply system by connecting the outputs of said at least one AC output inverter and said other power supply system to a load;

a synchronous circuit, connected to said bus, for synchronizing said at least a single AC output inverter with said other power supply system by outputting, to said at least a single AC output inverter, synchronous signals synchronizing with a frequency of said other power supply system;

a detection circuit for detecting a cross current component flowing between the at least a single output inverter and said other power supply system; and a control circuit for controlling the output voltage to restrain the cross current component detected by said detection circuit, wherein said control circuit controls the output voltage on the basis of a component attributed to an absolute value difference in the output voltage and said other power supply system in the cross current component detected by said detection circuit.

6. A parallel operation system comprising:

at least a single AC output inverter for controlling an instantaneous value of an output voltage by causing respective arms of the at least a single AC output inverter to effect switching in respective phases a plurality of times during one cycle;

other power supply system;

a bus for sharing a load current to said at least one AC output inverter and said other power supply system by connecting the outputs of said at least one AC output inverter and said other power supply system to a load;

a synchronous circuit, connected to said bus, for synchronizing said at least a single AC output inverter with said other power supply system by outputting, to said at least a single AC output inverter, synchronous signals synchronizing with a frequency of said other power supply system;

a detection circuit for detecting a cross current component flowing between the at least a single output inverter and said other power supply system; and a control circuit for controlling the output voltage to restrain the cross current component detected by said detection circuit, wherein said control circuit controls phases of the output voltages on the basis of components attributed to a phase difference in the output voltage and said other power supply system in the cross current component detected by said detection circuit.

7. A parallel operation system comprising:

a plurality of AC output inverters for controlling instantaneous values of output voltages by causing respective arms in each of the respective AC output inverters to effect switching in respective phases of the output voltages a plurality of times during one cycle;

a bus for sharing a load current to said plurality of AC output inverters by connecting outputs of said plurality of inverters to a load;

a detection circuit for detecting a cross current flowing between mutual inverters of said plurality of AC output inverters by separating the cross current into a first component attributed to an absolute value difference in the respective output voltages between said mutual inverters and a second component attributed to a phase difference in the respective output voltages between said mutual inverters; and a control circuit for controlling an absolute value of the respective output voltages of each of said plurality of AC output inverters to restrain the first component detected by said detection circuit and a phase of the respective output voltages of each of said inverters to restrain the second component.

8. A parallel operation system comprising:

at least a single AC output inverter for controlling an instantaneous value of an output voltage, the at least a single AC output inverter having respective arms to effect switching in respective phases of the output voltage a plurality of times during one cycle;

other power supply system;

a bus for sharing a load current to said at least a single AC output inverter and said other power supply system by connecting outputs of said at least a single AC output inverter and said other power supply system to a load;

a detection circuit for detecting a cross current flowing between respective inverters of said at least a single AC output inverter and said other power supply system by separating the cross current into a first component attributed to an absolute value difference in the output voltage between respective inverters and between said respective inverters and said other power supply system and a second component attributed to a phase difference in the output voltage between said respective inverters and between said respective inverters and said other power supply system; and a control circuit for controlling the absolute value of the output voltage of said at least a single AC output inverter to restrain the first component detected by said detection circuit and a phase of the output voltage of each of said respective inverters to restrain the second component.

9. A parallel operation system comprising:

a plurality of three-phase AC output inverters each including a reference sine wave generating circuit for controlling an instantaneous value of an output voltage by causing arms of each of the respective plurality of three-phase AC output inverters to effect switching in respective phases of the output voltage a plurality of times during one cycle with the aid of two components of synchronous rotational coordinates and for generating a sine wave signal serving as a reference for a coordinate transform;

a bus for sharing a load current to said plurality of three-phase AC output inverters by connecting outputs of said plurality of three-phase AC output inverters to a load;

a detection circuit for detecting a cross current component of an electric current flowing between said plurality of three-phase output inverters; and a control circuit for controlling the output voltages of respective inverters of the plurality of three-phase AC output inverters for restraining the cross current component detected by said detection circuit and for adjusting a phase of the sine wave signal generated from said reference sine wave generating circuit within each of said respective inverters.

10. The system as set forth in claim 9, wherein said control circuit adjusts the phase of the sine wave signal on the basis of a component attributed to a phase difference in the output voltage between said respective inverters in the cross current component detected by said detection circuit.

11. The system as set forth in claim 9, wherein said control circuit adjusts the phase of the sine wave signal on the basis of a component vertical to a virtual vector which is delayed by an output impedance angle of each of said respective inverters with respect to a bus voltage of the load current.

12. The system as set forth in claim 9, further comprising an additional three-phase AC power supply connected to said bus, wherein a reference sine wave signal generating circuit of each of said respective inverters has a phase control loop for synchronizing the synchronous rotational coordinates with said additional three-phase AC power supply.

13. The system as set forth in claim 12, wherein said control circuit restrains a cross current component between said respective inverters and said additional three-phase AC power supply by imparting, to said phase control loop, a component attributed to the phase difference in the output voltage between said respective inverters in the cross current component detected by said detection circuit.

14. The system as set forth in claim 12, wherein said control circuit restrains the cross current component between said respective inverters and said additional three-phase AC power supply by imparting, to said phase control loop, a component vertical to a virtual vector which is delayed by an output impedance angle of each of said respective inverters with respect to a bus voltage of the load current.

15. A parallel operation system comprising:

a plurality of AC output inverters for controlling instantaneous values of output voltages by causing respective arms of each of the AC output inverters to effect switching in respective phases a plurality of times during one cycle;

a bus for connecting outputs of said plurality of AC output inverters to a load so that a load current is shared by said plurality of AC output inverters;

a synchronous circuit for synchronizing said plurality of AC output inverters by outputting common synchronous signals to said plurality of AC output inverters;

a detection circuit for detecting a cross current component of an electric current flowing between mutual inverters of said plurality of AC output inverters; and a control circuit for respectively controlling each of the output voltages of said plurality of AC output inverters to restrain the cross current component detected by said detection circuit, wherein said control circuit respectively controls each of the output voltages of said plurality of AC output inverters on the basis of a component attributed to an absolute value of the output voltage between said mutual inverters in the cross current component detected by said detection circuit.

* * * * *